(12) United States Patent
Tsujimoto et al.

(10) Patent No.: US 9,033,584 B2
(45) Date of Patent: May 19, 2015

(54) ROLLING BEARING

(75) Inventors: Takashi Tsujimoto, Iwata (JP); Rino Fukami, Iwata (JP); Seiji Kanbara, Iwata (JP)

(73) Assignee: NTN CORPORATION, Osaka (JP)

( * ) Notice: Subject to any disclaimer, the term of this patent is extended or adjusted under 35 U.S.C. 154(b) by 2005 days.

(21) Appl. No.: 11/628,050

(22) PCT Filed: May 6, 2005

(86) PCT No.: PCT/JP2005/008359
§ 371 (c)(1),
(2), (4) Date: Jul. 3, 2007

(87) PCT Pub. No.: WO2006/001124
PCT Pub. Date: Jan. 5, 2006

(65) Prior Publication Data
US 2007/0258672 A1 Nov. 8, 2007

(30) Foreign Application Priority Data

| | | |
|---|---|---|
| Jun. 25, 2004 | (JP) | 2004-188637 |
| Jul. 5, 2004 | (JP) | 2004-198614 |
| Jul. 5, 2004 | (JP) | 2004-198620 |
| Jul. 26, 2004 | (JP) | 2004-217630 |
| Aug. 17, 2004 | (JP) | 2004-237679 |
| Aug. 17, 2004 | (JP) | 2004-237681 |
| Aug. 17, 2004 | (JP) | 2004-237682 |
| Aug. 17, 2004 | (JP) | 2004-237684 |

(51) Int. Cl.
*F16C 33/34* (2006.01)
*F16C 19/00* (2006.01)
(Continued)

(52) U.S. Cl.
CPC .............. *F16C 33/34* (2013.01); *F16C 2240/54* (2013.01); *F16C 33/32* (2013.01); *F16C 33/64* (2013.01); *F16C 33/6651* (2013.01); *F16C 2206/04* (2013.01)

(58) Field of Classification Search
CPC ...... F16C 33/32; F16C 33/34; F16C 33/6651; F16C 33/64; F16C 2206/04; F16C 2240/54
USPC .......... 384/450, 490, 491, 492, 548, 565, 619
See application file for complete search history.

(56) References Cited

U.S. PATENT DOCUMENTS

| | | | |
|---|---|---|---|
| 3,635,103 A | * | 1/1972 | Monti ........................ 475/346 |
| 4,893,387 A | | 1/1990 | Akamatsu et al. |

(Continued)

FOREIGN PATENT DOCUMENTS

| | | |
|---|---|---|
| EP | 1 329 596 | 7/2003 |
| EP | 1 770 292 | 4/2007 |

(Continued)

OTHER PUBLICATIONS

Supplementary European Search Report mailed Nov. 4, 2008 for European Application No. 05737097.5.

(Continued)

*Primary Examiner* — James Pilkington
(74) *Attorney, Agent, or Firm* — Wenderoth, Lind & Ponack, L.L.P.

(57) ABSTRACT

At least the surfaces of rolling elements of a rolling bearing are each randomly formed with an innumerable number of microconcave-like pits. The surface roughness parameter Ryni of the surfaces provided with the pits is in a range of 0.4 to 1.0 μm, and the Sk value is −1.6 or below.

18 Claims, 28 Drawing Sheets

(51) Int. Cl.
*F16C 33/32* (2006.01)
*F16C 33/64* (2006.01)
*F16C 33/66* (2006.01)

(56) References Cited

U.S. PATENT DOCUMENTS

| | | | | |
|---|---|---|---|---|
| 5,064,298 | A | * | 11/1991 | Hibi et al. .................. 384/625 |
| 5,203,228 | A | * | 4/1993 | Miyawaki et al. .......... 74/579 R |
| 5,352,303 | A | * | 10/1994 | Murakami et al. ........... 148/318 |
| 5,641,038 | A | * | 6/1997 | Akamatsu .................... 184/6.17 |
| 5,672,014 | A | | 9/1997 | Okita et al. |
| 5,997,988 | A | * | 12/1999 | Sada ............................ 428/141 |
| 6,036,374 | A | * | 3/2000 | Fisher et al. ................. 384/621 |
| 6,325,867 | B1 | | 12/2001 | Okita et al. |
| 6,598,571 | B1 | | 7/2003 | Harimoto et al. |
| 2003/0123769 | A1 | * | 7/2003 | Ohki ............................ 384/492 |
| 2004/0079310 | A1 | | 4/2004 | Suzuki et al. |
| 2004/0179761 | A1 | | 9/2004 | Ohki et al. |
| 2007/0151633 | A1 | | 7/2007 | Ohki et al. |
| 2007/0286543 | A1 | | 12/2007 | Tsujimoto et al. |
| 2008/0193069 | A1 | | 8/2008 | Tsujimoto et al. |

FOREIGN PATENT DOCUMENTS

| | | |
|---|---|---|
| EP | 1 770 293 | 4/2007 |
| GB | 2 219 359 | 12/1989 |
| GB | 2 238 584 | 6/1991 |
| GB | 2 342 409 | 4/2000 |
| JP | 1-30008 | 6/1989 |
| JP | 2-130205 | 5/1990 |
| JP | 2-168021 | 6/1990 |
| JP | 3-117725 | 5/1991 |
| JP | 3-172608 | 7/1991 |
| JP | 3-84417 | 8/1991 |
| JP | 3-84418 | 8/1991 |
| JP | 3-223548 | 10/1991 |
| JP | 4-56254 | 5/1992 |
| JP | 4-266410 | 9/1992 |
| JP | 4-282018 | 10/1992 |
| JP | 4-327019 | 11/1992 |
| JP | 5-10108 | 1/1993 |
| JP | 6-42536 | 2/1994 |
| JP | 6-341441 | 12/1994 |
| JP | 7-6524 | 1/1995 |
| JP | 8-311603 | 11/1996 |
| JP | 9-53148 | 2/1997 |
| JP | 10-8136 | 1/1998 |
| JP | 10-131970 | 5/1998 |
| JP | 2000-205284 | 7/2000 |
| JP | 2001-73072 | 3/2001 |
| JP | 2002-130409 | 5/2002 |
| JP | 2002-242927 | 8/2002 |
| JP | 2002-364648 | 12/2002 |
| JP | 2003-139147 | 5/2003 |
| JP | 2003-226919 | 8/2003 |
| JP | 2003-239967 | 8/2003 |
| JP | 2004-137553 | 5/2004 |
| WO | 2005/036003 | 4/2005 |

OTHER PUBLICATIONS

"Geometrical Product Specifications (GPS)—Surface texture: Profile method—Terms, definitions and surface texture parameters" ISO 4287:1997, No. 1, Jan. 1, 1997, pp. 1-35, XP009105876.
"Geometrical Product Specifications (GPS)—Surface texture: Profile method—Terms, definitions and surface texture parameters" ISO 4287:1997, Technical Corrigendum 1, Jun. 15, 1998, pp. 1 and 2, XP008097943.
"Geometrical Product Specifications (GPS)—Surface texture: Profile method—Terms, definitions and surface texture parameters" ISO 4287:1997, Technical Corrigendum 2, Feb. 15, 2005, pp. 1 and 2, XP008097942.
Japanese Office Action mailed Feb. 22, 2010 in corresponding Japanese Patent Application No. 2004-188637 with English translations.
Japanese Office Action mailed Feb. 22, 2010 in corresponding Japanese Patent Application No. 2004-198620 with English translations.
Japanese Office Action mailed Feb. 23, 2010 in corresponding Japanese Patent Application No. 2004-198614 with English translations.
Japanese Office Action mailed Mar. 1, 2010 in corresponding Japanese Patent Application No. 2004-237679 with English translations.
Japanese Interrogation issued Nov. 19, 2010 in corresponding Japanese Application No. 2004-198614 (with English translation).

* cited by examiner

Time

Time

FIG. 15A
FIG. 15B
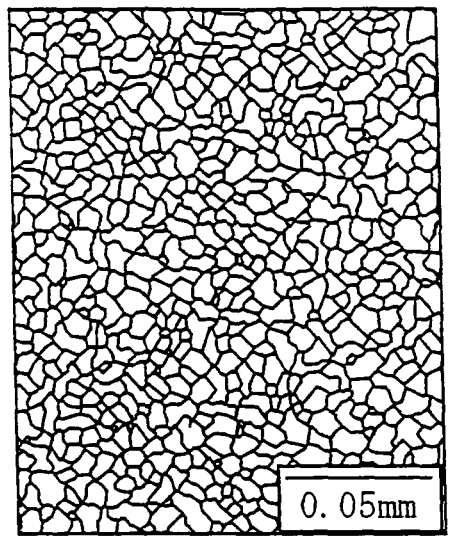
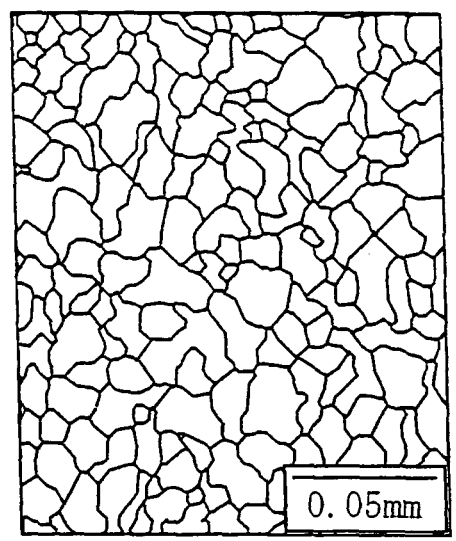
FIG. 16
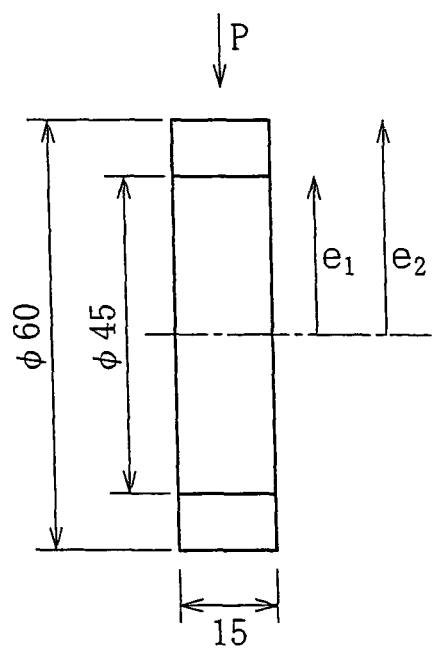

ROLLING BEARING

TECHNICAL FIELD

This invention relates to a rolling bearing, and though not in a limiting sense, the invention is applicable, for example, to a roller bearing used in the shaft support section of the transmission of an automobile.

BACKGROUND ART

Japanese Patent Laid-Open Nos. Hei 2-168021 and Hei 6-52536 show rolling bearings whose oil film forming capability has been improved by micro-concavoconvexes on the surfaces of rolling elements. In this prior art, measures are taken against damage, such as peeling damage, to the roller bearing due to poor lubrication, by providing microconcave-like pits in the rolling surfaces of the rollers or the rolling contact surfaces of the rollers and/or the raceway surfaces of the inner and outer rings, so that with the surface roughness denoted by the parameter Rqni, the ratio Rqni (L)/Rqni (C)≤1.0, where Rqni (L) is the axial surface roughness and Rqni (C) is the circumferential surface roughness, and the surface roughness parameter Sk value≤−1.6, thereby ensuring a long life irrespective of whether the mating surface is a rough or well-finished surface.

In automobile transmissions and other regions where rolling bearings are used, the trend toward size reduction and high output attainment has been advancing more and more in recent years, and the usage environment, including the use of low viscosity lubricating oils, tends to higher loads and higher temperatures. For this reason, the lubrication environment is changing to one that is more severe than ever before for bearings, so that wear due to poor lubrication, surface-start abrasion, decreased fatigue life, and abrasion under conditions of foreign-matter inclusion are tending to occur more easily. Accordingly, it is necessary to ensure that life extension can be attained under any lubricating conditions, including low viscosity harsh lubrication, foreign-matter inclusion environment, and clean lubrication.

Conventional microconcave-like pits are such that with the surface roughness denoted by the parameter Rqni, the ratio Rqni (L)/Rqni (C) is 1.0 or below (Rqni≥0.10), where Rqni (L) is the axial surface roughness and Rqni (C) is the circumferential surface roughness, and the surface roughness parameter Sk value is −1.6 or below, thereby ensuring a long life irrespective of whether the mating surface is a rough or well-finished surface. In the case where the oil film is extremely thin under lean lubrication, however, there are cases where its effects cannot be fully developed.

DISCLOSURE OF THE INVENTION

According to an embodiment of the invention, a rolling bearing is such that at least the surfaces of the rolling elements are randomly provided with an innumerable number of microconcave-like pits and the surface roughness parameter Ryni of the surface provided with said pits is in the range 0.4 $\mu m \leq Ryni \leq 1.0$ $\mu m$ and the Sk value is −1.6 or below.

Here, the parameter Ryni is the mean value of maximum heights per reference length, i.e., the value found by extracting a reference length from a roughness curve in the direction of the mean line, and measuring the distance between the apex line and the root line of the extracted portion, in the direction of the longitudinal magnification factor of the roughness curve (ISO 4287:1997).

The parameter Sk refers to the degree of distortion (skewness) of the roughness curve (ISO 4287:1997), which is a standard statistical value to know the asymmetry of concavoconvex distribution. In the case of a symmetrical distribution as in the Gauss distribution, the Sk value approaches 0. When the raised portions of the concavoconvexes are deleted, the Sk value will take a negative value, and in the reverse case, it will take a positive value. The Sk value can be controlled by selection of such factors as the rotative speed of a barrel polishing machine, processing time, work charging rate, and the type and size of chips. Setting the Sk value at −1.6 or below both widthwise and circumferentially results in the micro-concavoconvex-like pits becoming oil reservoirs, so that even if the oil is compressed, it leaks little in the slide direction or right-angle direction, providing such advantages as superior oil film formation, good oil film forming status, and suppressing surface damage to a minimum.

As is known in the art, a rolling bearing is a machine element for supporting a rotating or swinging shaft by the rolling motion of rolling elements (balls or rollers). Usually, the rolling elements are rollably interposed between the raceways of the inner and outer rings; however, there is a type having no inner ring and instead using the outer peripheral surface of a shaft directly as a raceway surface, and another type having no outer ring and instead using the inner peripheral surface of a gear, for example, directly as a raceway surface. In the case where such terms as inner member and outer member are used, they are intended not to exclude shafts and gears, as well as inner and outer rings, having raceway surfaces. In the case where such expression as at least the surfaces of the rolling elements is used, this is intended not to exclude the case where the raceway surface is likewise formed with microconcave-like pits. And, in the case where the rolling elements are rollers, the expression is intended not to exclude the case where not only the rolling contact surfaces but also the end surfaces are formed with microconcave-like pits.

According to this invention, random provision of at least the surfaces of rolling elements with an innumerable number of microconcave-like pits results in improved oil film forming capability, providing a long life even under conditions of extremely thin oil film under low viscosity and lean lubrication. Particularly, setting the surface roughness parameter Ryni of the surface provided with the pits such that 0.4 $\mu m \leq Ryni \leq 1.0$ $\mu m$, so as to suppress it to be smaller than in the prior art, makes it possible to prevent oil film shortages even under lean lubrication, providing a long life even under conditions of extremely thin oil film under low viscosity and lean lubrication, as compared with a conventional article. Further, as for the Sk value, −1.6 or below is a range in which the shape and distribution of surface concaves are advantageous for oil film formation depending upon processing conditions.

According to another embodiment of the invention, at least the surfaces of rolling elements are randomly provided with an innumerable number of microconcave-like pits, the rolling elements each having a nitrogen rich layer, and the particle size number of austenite crystal grains in said nitrogen rich layer is in the range exceeding number 10.

The nitrogen rich layer, which is a surface layer formed on the raceway ring (outer ring or inner ring) or rolling element, having increased nitrogen content, can be formed by carbonitriding or nitriding. The nitrogen content in the nitrogen rich layer is preferably in the range of 0.1%-0.7% (the nitrogen content is measured in weight % in accordance with EPMA). If the nitrogen content is less than 0.1%, no effect will be produced and the rolling life will decrease particularly under conditions of foreign matter inclusion. If the nitrogen content exceeds 0.7%, holes called voids will form or the amount of retained austenite will be too much to provide hardness, leading to short life. The nitrogen content of the nitrogen rich layer formed in the raceway ring is a value measured at the 50 μm-deep surface layer of the raceway surface after grinding; it can be measured by EPMA (wavelength-diffusion type X-ray microanalyzer).

Random provision of at least the surfaces of rolling elements with an innumerable number of microconcave-like pits results in improved oil film forming capability, providing a long life even under conditions of extremely thin oil film under low viscosity and lean lubrication. Particularly, setting the area factor of said pits in the range of 5-20% makes it possible to prevent oil film shortage even under lean lubrication, providing a long life even under conditions of extremely thin oil films, as compared with a conventional article. The area factor of pits means, in the case where the rolling contact surface is randomly provided with an innumerable number of microconcave-like pits, the proportion of the area occupied by such pits to the area of the entire rolling contact surface.

The fact that the austenite grain diameter is so small that the grain size number of austenite crystal grains exceeds number 10 makes it possible to greatly improve rolling fatigue life. If the grain size number of austenite grain diameter is not more than number 10, the rolling fatigue life will not be improved so much; therefore, it is set in the range exceeding number 10. Normally, it is set to be not less than number 11. The smaller the austenite grain diameter, the more desirable. Generally, however, it is difficult to obtain a grain size number which exceeds number 13. In addition, the austenite grains in the bearing part change neither in the surface layer having the nitrogen rich layer nor in the interior inside the same. Therefore, the positions in which to define the range of crystal grain size number shall be the surface layer and the interior. The austenite crystal grains are such that for example, even after a hardening treatment has been performed, traces of austenite crystal grain boundaries, which are present immediately before the hardening, remain, and it is on the basis of such traces that crystal grains are referred to. Thus, micronization of austenite grain size to number 11 or above after formation of the nitrogen rich layer results in the rolling fatigue life being greatly improved, making it possible to obtain superior anti-crack strength and resistance to time-dependent dimensional change.

The surface roughness parameter Rymax of the surface provided with said pits is preferably in the range of 0.4-1.0. The parameter Rymax is the maximum value of the maximum height per reference length (ISO 4287:1997).

When the surface roughness of the surface provided with the pits is denoted by the parameter Rqni, the value of the ratio between the axial surface roughness Rqni (L) and the circumferential surface roughness Rqni (C), i.e., the ratio Rqni (L)/Rqni (C), is preferably 1.0 or below. The parameter Rqni is a square root obtained by integrating the square of deviation of the height from the roughness centerline to the roughness curve over the interval of measured length and taking the mean over that interval, and is also known as the root-mean-square root roughness. The Rqni is found by numerical calculations from an enlarged recorded sectional curve or roughness curve and is measured by moving the contact needle of a roughness meter widthwise and circumferentially.

These and other objects and features of the invention will become more apparent from the following description.

BRIEF DESCRIPTION OF THE DRAWINGS

FIG. 15A is a schematic view of FIG. 14A;
FIG. 15B is a schematic view of FIG. 14B;
FIG. 16 is a sectional view of a test piece for static crush strength tests (measurement of breaking stress value)

BEST MODE FOR CARRYING OUT THE INVENTION

Figure 1:
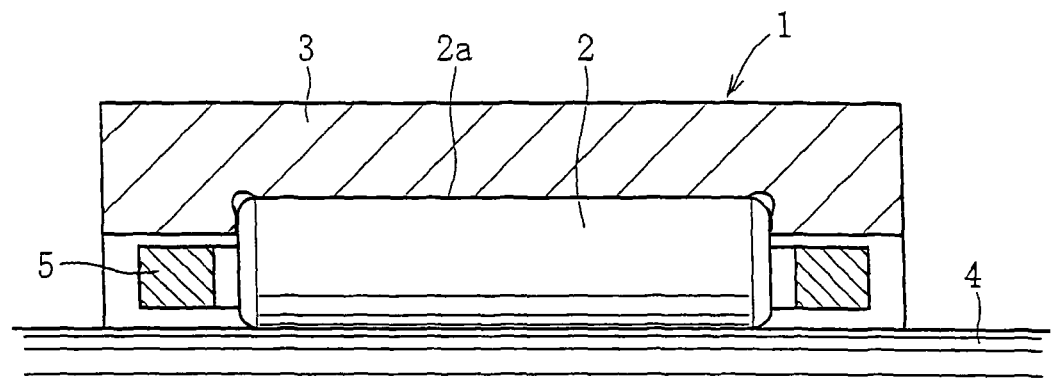
FIG. 1 is a sectional view of a needle roller bearing.

A rolling bearing has such main component elements as an inner ring, an outer ring, and rolling elements. And, the rolling surfaces and end surfaces of the rolling elements, and/or the raceway surfaces of the inner and outer rings (further, regarding the inner ring of a tapered roller bearing, the cone back face rib) are randomly formed with an innumerable number of microconcave-like pits for surface-microroughening. In this microroughened surface, the surface roughness parameter Rqni of the surface provided with the pits is in the range 0.4 μm≤Ryni≤1.0 μm and the Sk value is −1.6 or below, preferably in the range of −4.9 to −1.6. Further, the surface roughness parameter Rymax of the surface provided with the pits is in the range of 0.4-1.0. Further, when the surface roughness is found both axially and circumferentially of the surface and denoted by the parameter Rqni, the value of the ratio between the axial surface roughness Rqni (L) and the circumferential surface roughness Rqni (C), i.e., the ratio Rqni (L)/Rqni (C), is preferably 1.0 or below. As for the surface processing to obtain such microroughened surface, special barrel polishing may be used to obtain a desired finished surface; however, shot peening or the like may be employed.

Examples of methods and conditions for measurement of the parameters Ryni, Rymax, Sk, and Rqni are as follows. In addition, in measuring the surface status expressed by these parameters, a measured value taken at a single place can be relied on as a representative, but it is recommendable to take measures, for example, at two diametrically opposite places.

Parameter Calculation Standards: JIS B 0601:1994 (SURFCOM JIS 1994).

Cut-Off Classification: Gaussian.

Measured Length: 5λ.

Cut-Off Wavelength: 0.25 mm.

Measurement Magnification: ×10000.

Measurement Speed: 0.30 mm/s.

Measured Place: roller central region.

The Number of Measurements: 2.

Measuring Device Surface Roughness Measuring Unit, SURFCOM 1300 A (TOKYO SEIMITSU KABUSHIKI KAISHA).

In the case of microconcave-like pits provided on roller rolling surfaces, the area factor of the pits in the entire rolling surface is in the range of 5-20%, and the mean area of pits is 30-100 μm² when arranged excluding equivalent circle diameters of 3 μmφ or below. If the Rymax is outside the range of 0.4-1.0 μm, with the area factor of the pits exceeding 20%, with the mean area exceeding 100 μm², the contact effective length tends to decrease and so does the effect of long life. Quantitative measurements of pits can be made by enlargement of the roller surface and quantification from the image thereof by means of a commercially available image system. Further, if the surface status testing method and surface status testing device of Japanese Patent Laid-Open No. 2001-183124 are used, stabilized and accurate measurements can be made. The white portions in the image are analyzed as surface flat portions, and the micropits as black portions. The measuring conditions are as follows. Further, in the case where the area of pits and mean area are measured as to such component elements as the rolling elements of a rolling bearing and raceway surfaces thereof, a measured value taken at a single place can be relied on as a representative, but it is recommended to measure them at two places, for example.

Area Factor: a proportion of picture elements (black) smaller than two-value threshold value [(brightness of bright portions+brightness of dark portions)/2].

Mean Area: total of black areas/whole sum.

Measurement Visual Field: 826 μm×620 μm (when the roller diameter is less than φ4, 413 μm×310 μm is preferable)

Measured Place: roller central region.

The Number of Measurements: 2

Figure 2:
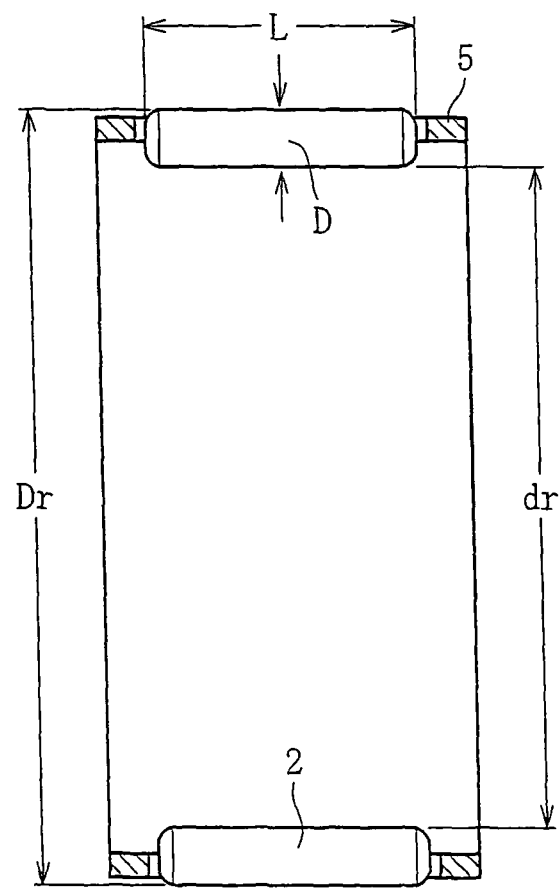
FIG. 2 is a sectional view of a needle roller bearing in life tests.
Figure 3:
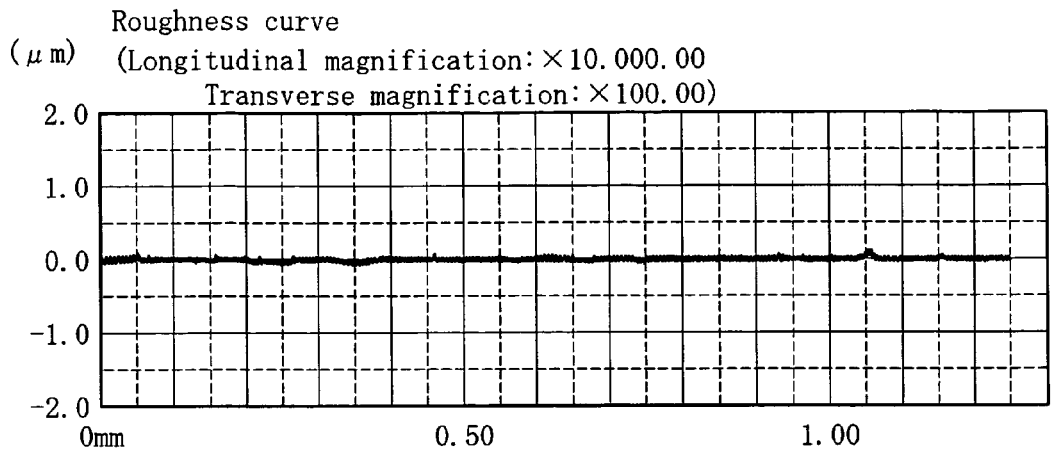
FIG. 3 is a roughness curve showing the finished status of rolling elements in test bearings.
Figure 4:
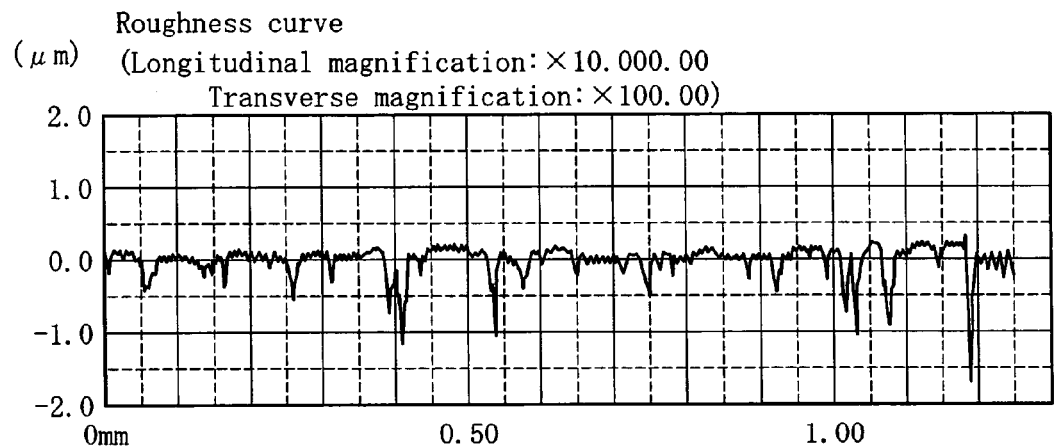
FIG. 4 is a roughness curve showing the finished status of rolling elements in test bearings.
Figure 5:
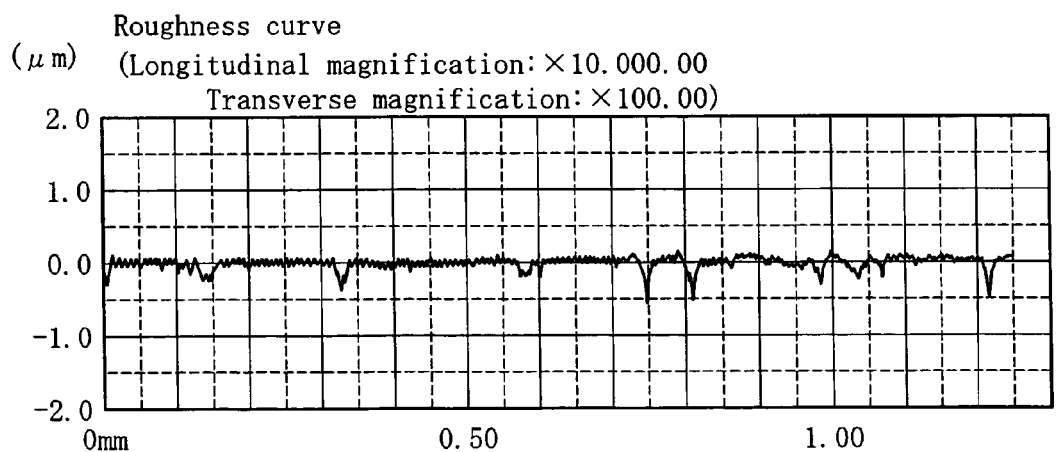
FIG. 5 is a roughness curve showing the finished status of rolling elements in test bearings.

FIG. 1 shows a first example of a rolling bearing. This rolling bearing 1 is a needle roller bearing in which needle rollers 2 serving as rolling elements are incorporated into an outer ring 3, it being arranged that the needle rollers 2 support a mating shaft 4. A plurality of types of needle roller bearings with needle roller surfaces having different surface treatments on finished surfaces were prepared and life test were conducted thereon. The results thereof will now be described. A needle roller bearing used in life tests is shown in FIG. 2, this being a bearing with a cage 5 using 15 needle rollers; outer diameter Dr=33 mm, inner diameter dr=25 mm, diameter D of needle rollers 2=4 mm, and length L=25.8 mm. Three types of test bearings were prepared which differed in surface roughness finish of needle rollers. That is, they are a bearing A (comparative example) superfinished after grinding, a bearing B (comparative example) randomly formed with an innumerable number of microconcave-like pits, and a bearing C (example). The finished surface status in the needle rollers of each test bearing is shown in FIGS. 3 through 5. Specifically, FIG. 3 shows the surface roughness of the bearing A; FIG. 4 shows the surface roughness of the bearing B; and FIG. 5 shows the surface roughness of the bearing C. Further, the characteristic value parameter list of the finished surface of each test bearing is shown in Table 1. In addition, as for the Rqni (L/C), it is 1.0 or below for the bearings B and C, and about 1.0 for the bearing A.

TABLE 1

| Bearing | Rqni (μm) | Sk | Ryni (μm) | Rymax | Area percentage (%) | Average area (μm²) | Rqni (L/C) |
|---|---|---|---|---|---|---|---|
| A (comparative example) | 0.01 to 0.03 | −0.8 to 0.9 | 0.1 to 0.2 | 0.1 to 0.3 | — | — | — |

TABLE 1-continued

| Bearing | Rqni (μm) | Sk | Ryni (μm) | Rymax | Area percentage (%) | Average area (μm²) | Rqni (L/C) |
|---|---|---|---|---|---|---|---|
| B (comparative example) | 0.10 to 0.20 | −5.0 to −2.0 | 1.1 to 1.5 | 1.1 to 2.0 | 24 to 40 | 105 to 150 | ≤1.0 |
| C (Example) | 0.05 to 0.09 | −4.9 to −1.6 | 0.4 to 1.0 | 0.4 to 1.0 | 5 to 20 | 30 to 100 | ≤1.0 |

Figure 6:
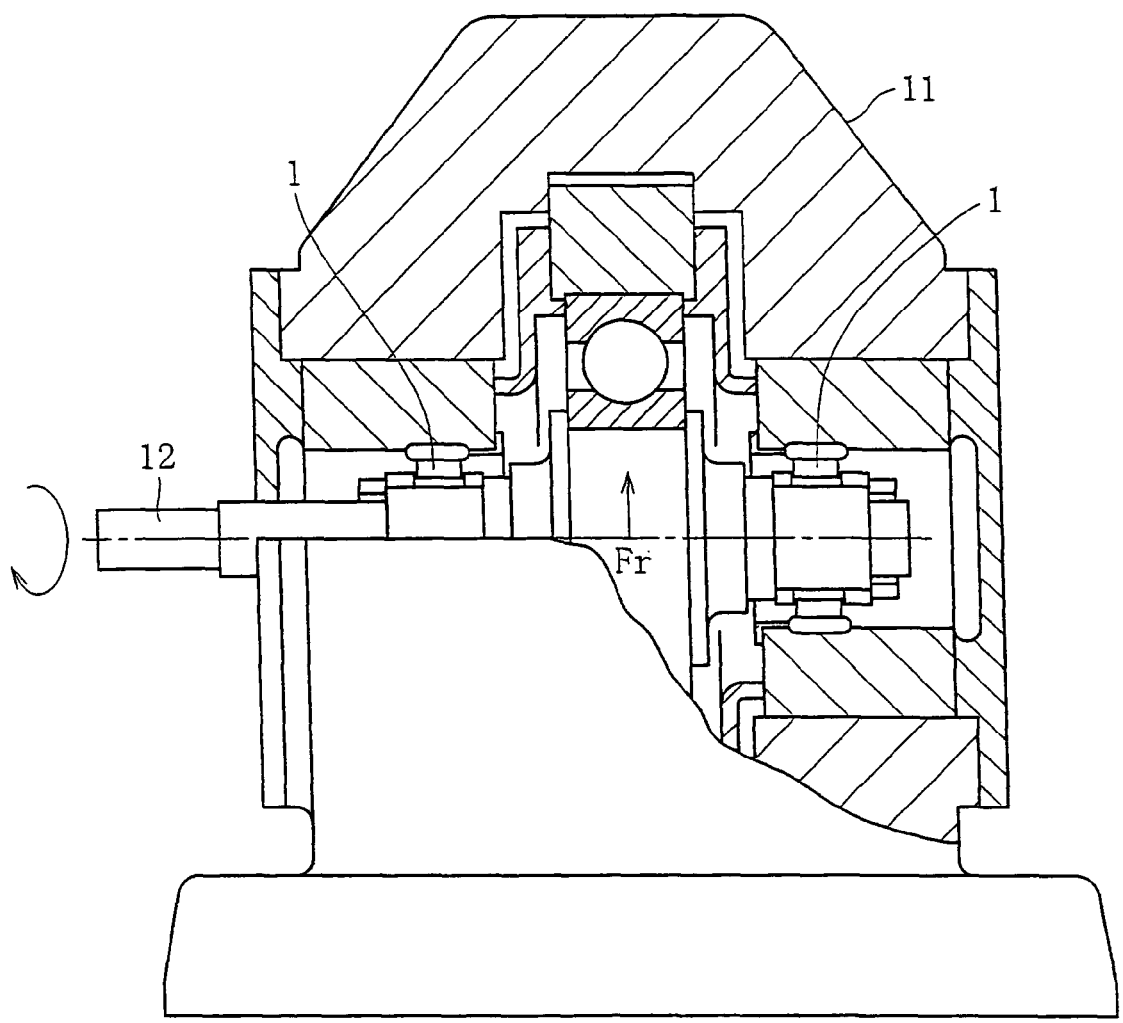
FIG. 6 is a schematic partial sectional view of a testing device.
Figure 7:
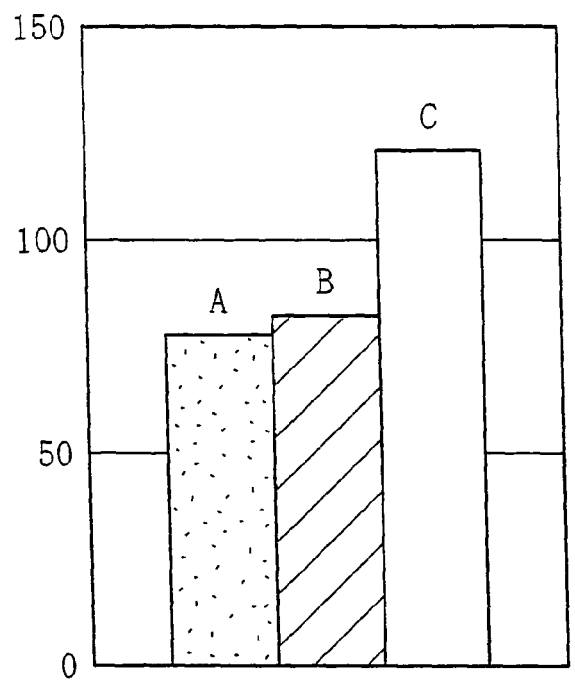
FIG. 7 is a block graph showing life test results.

The testing device used is a radial load testing machine 11 as schematically shown in FIG. 6, wherein the test bearings 1 are attached to the opposite sides of the rotary shaft 12 and rotation and load are imparted to conduct tests. The finish of the inner race (mating shaft) used in tests is 0.1-0.16.μm in terms of RaO of polish finish.
The outer race (outer ring) is common. The test conditions are as follows.
Bearing Radial Load: 2000 Kgf.
The Number of Revolutions: 4000 rpm.
Lubricating Oil: CRYSEC OIL H8 (2 cst under test conditions).
FIG. 7 shows the results of life tests under oil film parameter Λ=0.13. The vertical axis in the same figure denotes L10 life (h). As is clear from the same figure, whereas it was 78 h for the bearing A and 82 h for the bearing B, it was 121 h for the bearing C. As this data shows, the bearing C, which is an example, can obtain a long life effect even under conditions of very harsh lubrication having as low a viscosity and leanness as the oil film parameter Λ=0.13.

Figure 8:
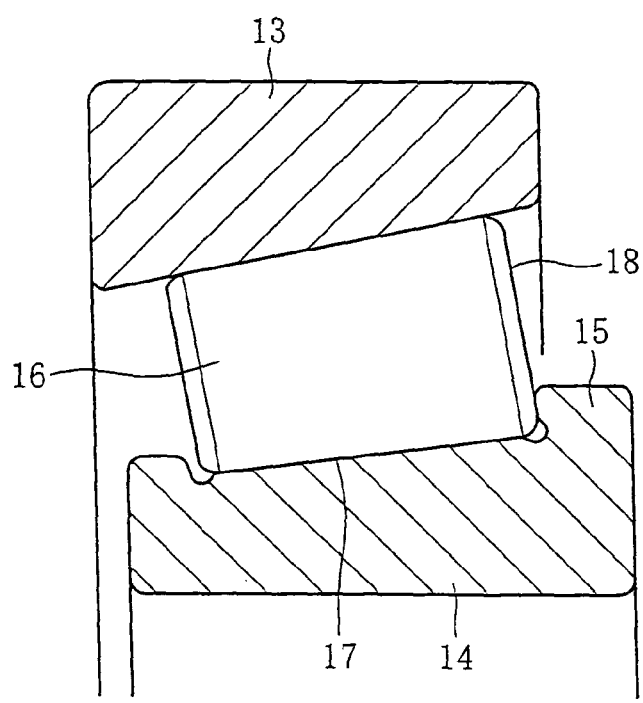
FIG. 8 is a sectional view of a tapered roller bearing.

Next, FIG. 8 shows a tapered roller bearing as a second example of a rolling bearing. The tapered roller bearing is a radial bearing using tapered rollers 16 as rolling elements, with the plurality of tapered rollers 16 rollably interposed between the raceways of the outer and inner rings 13 and 14, respectively. During operation, the rolling surfaces 17 of the tapered rollers 16 come in rolling contact with the raceways of the outer and inner rings 13 and 14; besides this, the large end surfaces 18 of the tapered rollers 16 come in sliding contact with the inner surface of the cone back face rib 15 of the inner ring 14. Therefore, in the case of the tapered rollers 16, the large end surface 18, as well as the rolling surfaces 17, may be randomly formed with an innumerable number of microconcave-like pits. Similarly, in the case of the inner ring 14, the inner surface of the cone back face rib 15, as well as the raceway surface, may be randomly formed with an innumerable number of microconcave-like pits.

The results of life tests will now be described which were conducted on the conventional tapered roller bearings A and B (comparative examples) in which the rolling surfaces of the tapered rollers are finished as smooth surfaces, bearings C-E (comparative examples) in which the rolling surfaces of the tapered rollers are randomly formed with an innumerable number of microconcave-like pits, and bearings F and G (examples) (see Table 2). The bearings A-G used are all tapered roller bearings in which the outer diameter of the outer ring is 81 mm and the inner diameter of the inner ring is 45 mm. In addition, the rolling surfaces of the rollers in the bearings A and B of comparative examples are processed by applying superfinish thereto after grinding, with no pit-forming process applied thereto. The rolling surfaces of the rollers of the bearings C-E of comparative examples and the bearings F and G of examples are randomly formed with an innumerable number of microconcave-like pits by a barrel polish special process. In addition, as for the Rqni (L/C), it is 1.0 or below for the roller bearings C-G, and about 1.0 for the roller bearings A and B.

TABLE 2

| Test bearing | | Mean area (μm²) | Ryni (μm) | Area factor (%) | Sk | Rqni (L/C) | Rymax | Life-time (h) |
|---|---|---|---|---|---|---|---|---|
| Comparative example | A | — | 0.32 | — | −0.9 | — | 0.5 | 11.5 |
| | B | — | 0.41 | — | −0.7 | — | 0.7 | 9.2 |
| | C | 132 | 1.47 | 25 | −4 | ≤1.0 | 1.9 | 15.5 |
| | D | 113 | 1.12 | 19 | −3.2 | ≤1.0 | 1.2 | 50.5 |
| | E | 30 | 0.32 | 5 | −1.8 | ≤1.0 | 0.5 | 19.8 |
| Example | F | 94 | 0.95 | 17 | −2.6 | ≤1.0 | 1 | 129.6 |
| | G | 52 | 0.52 | 8 | −1.8 | ≤1.0 | 0.6 | 200 or above |

Figure 9:
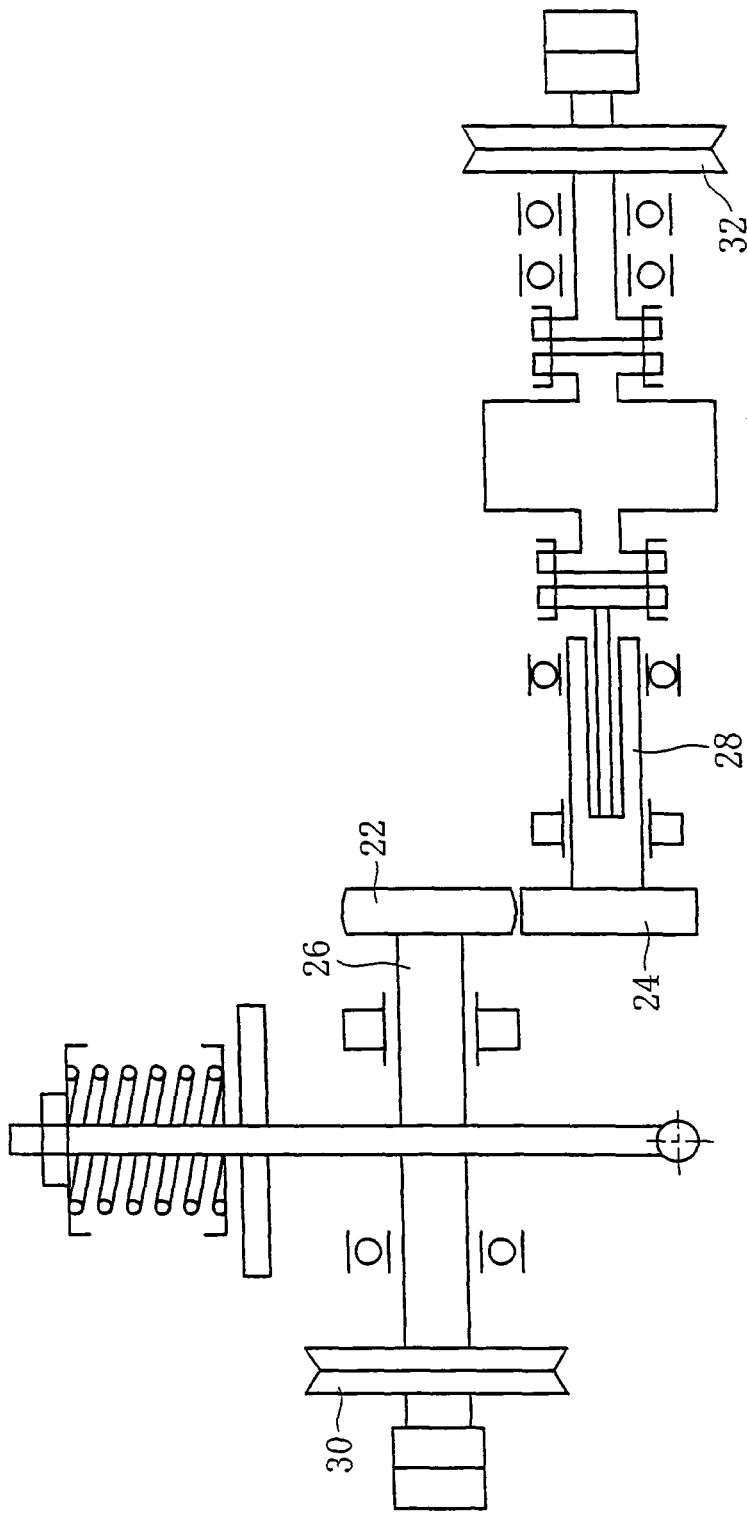
FIG. 9 is an overall schematic view of a 2-cylinder testing machine.

Peeling tests were conducted using 2-cylinder testing machine shown in FIG. 9, and metal contact factor was evaluated. In the same figure, a driving-side cylinder 22 (D-cylinder: Driver) and a driven-side cylinder 24 (F-cylinder: Follower) are attached to one of the respective sides of individual shafts, and two rotary shafts 26 and 28 are adapted to be driven by individual motors through respective pulleys 30 and 32. The shaft 26 on the D-cylinder 22 side is driven by a motor, while the F-cylinder 24 is adapted for free rolling, driven by the D-cylinder 22. Two types of F-cylinders 24 were prepared for a comparative example and an example in connection with surface treatment. The details of the test conditions and the like are as shown in Table 3.

TABLE 3

| | 2-cylinder testing machine (see FIG. 9) | |
|---|---|---|
| Testing machine | | |
| Driving cylinder (D-cylinder) | φ40 × L12, auxiliary curvature R60, SUJ2 standard article + outer diameter surface superfinished | |
| Driven cylinder (F-cylinder) | φ40 × L12, straight SUJ2 standard article + outer diameter surface superfinished | |
| | Surface Treatment | |
| | Comparative example | Example |
| Mean area (μm²) | 145 | 83 |
| Ryni (μm) | 1.21 | 0.73 |
| Area factor (%) | 20 | 15 |
| Number of revolutions | 20000 rpm | |
| Load | 2156N (220 Kgf) | |
| Maximum surface pressure Pmax | 2.3 GPa | |
| Contact ellipse (2a × 2b) | 2.34 mm × 0.72 mm | |
| Number of times of loading | 2.4 × 10⁵ (2 h) | |

TABLE 3-continued

| | |
|---|---|
| Atmosphere temperature | Ordinary temperature |
| Oiling method | Felt-pad oiling |
| Lubricating oil | JOMO HI SPEED FLUID (VG 1.5) |

Figure 10A:
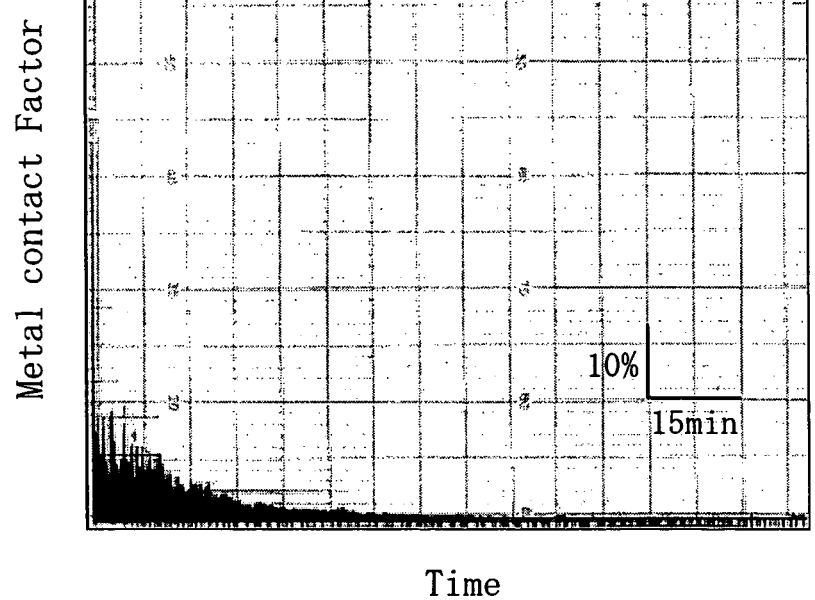
FIG. 10A is a graph showing the metal contact factor in examples.
Figure 10B:
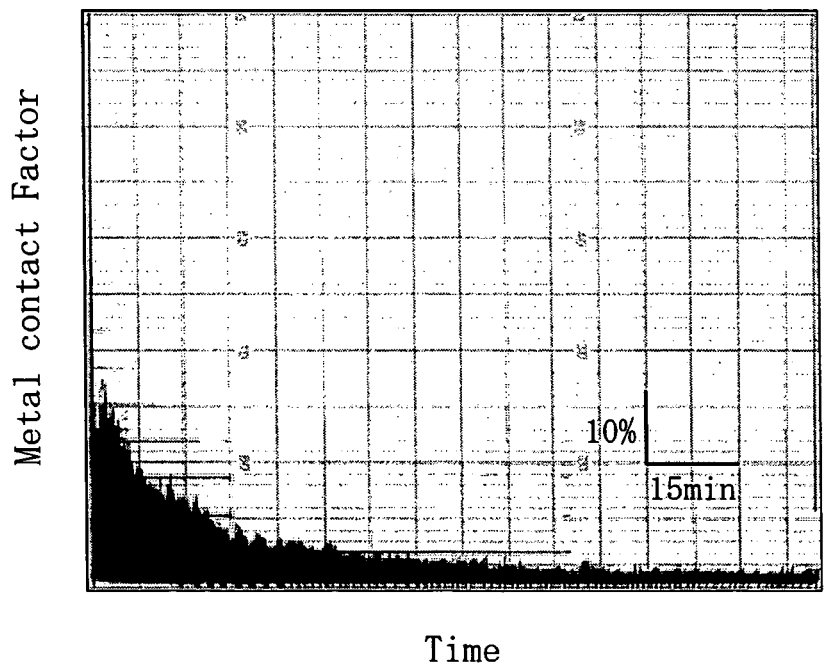
FIG. 10B is a graph showing the metal contact factor in comparative examples.

Comparative data on metal contact factor is shown in FIGS. 10A and 10B. In these figures, the horizontal axis denotes the elapsed time and the vertical axis denotes the metal contact factor. FIG. 10A shows the metal contact factor of the rolling surfaces of the rollers in the bearing of example, and FIG. 10B shows the metal contact factor of the rolling surfaces of the rollers in the bearing of comparative example. A comparison between these figures makes it possible to clearly confirm that the metal contact factor in the example is improved over the comparative example. In other words, the oil film forming factor (=100%−metal contact factor) is improved by about 10% at the start of operation and about 2% after the end of the test (about 2 hours later) for the bearing of example over the bearing of comparative example.

Figure 11:
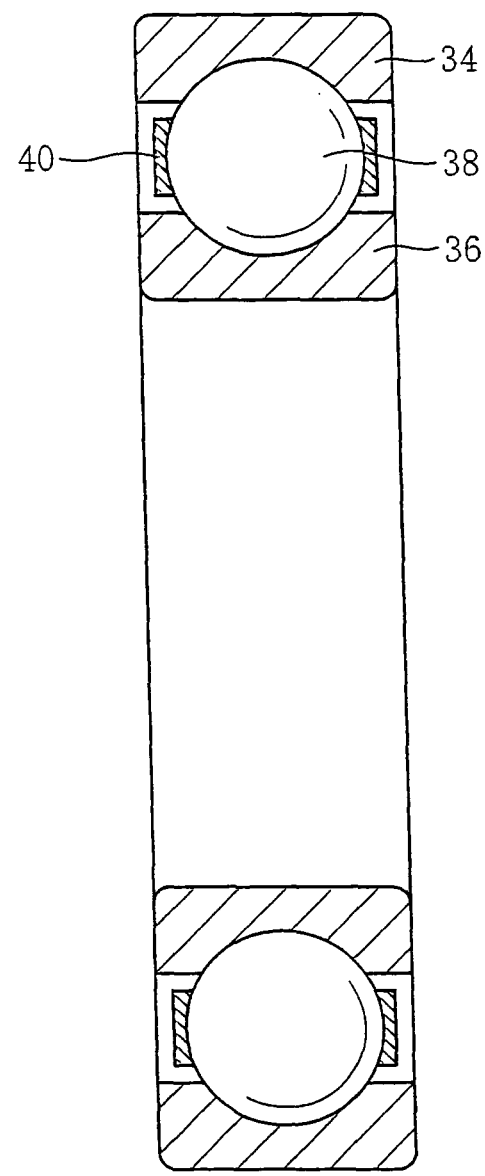
FIG. 11 is a sectional view of a ball bearing.

Nest, as another example of a rolling bearing, a deep groove ball bearing is shown in section in FIG. 11. This rolling bearing has such main component elements as an outer ring 34, an inner ring 36, a plurality of rolling elements 38 rollably interposed between the raceway of the outer ring 34 and the raceway of the inner ring 36, and a cage 40. The rolling elements 38, which herein are balls, are held at predetermined circumferential intervals by the cage 40. At least one of the bearing parts, i.e., the outer ring 34, the inner ring 36, and the rolling elements 38, constituting the rolling bearing has a nitrogen rich layer. As a concrete example of a treatment for forming nitrogen rich layers, a description will be given of a heat treatment including carbonitriding.

Figure 12:
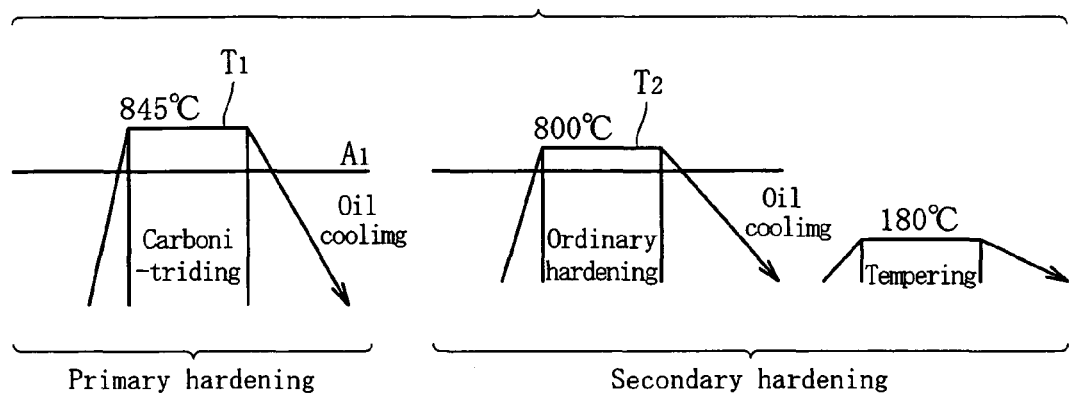
FIG. 12 is a heat treatment diagram for explaining a heat treating method for rolling bearings.
Figure 13:
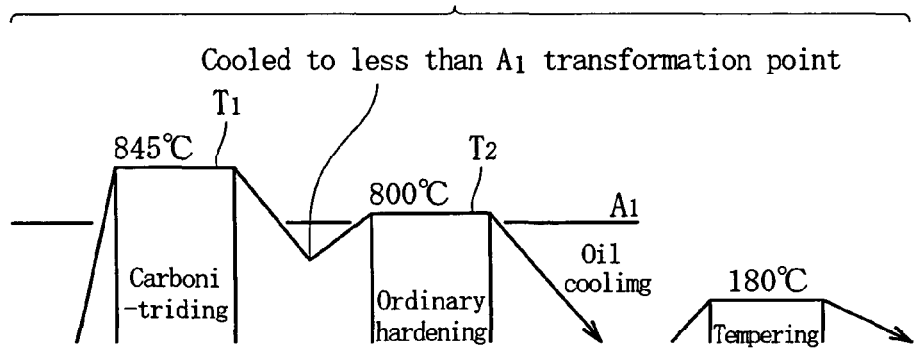
FIG. 13 is a heat treatment diagram for explaining a modification of the heat treating method for rolling bearings.

FIG. 12 is a view for explaining a heat treating method for rolling bearings in an embodiment of the invention, and FIG. 13 is a view for explaining a modification thereof. FIG. 12 is a heat treatment pattern showing a method in which primary and secondary hardenings are performed, and FIG. 13 is a heat treatment pattern showing a method in which a material is cooled to a temperature less than $A_1$ transformation temperature in the course of hardening, and then it is reheated for final hardening. In these figures, at a treatment $T_1$, penetration of carbon is fully effected with carbon and nitrogen diffused in the substrate of steel, and then it is cooled to a temperature less than $A_1$ transformation temperature. Next, at a treatment $T_2$ in the figures, it is reheated to a temperature above $A_1$ transformation temperature and lower than the treatment $T_1$, from which temperature it is subjected to oil-hardening.

The above heat treatment makes it possible to improve crack strength and to reduce time-dependent dimensional change rate, while carbonitriding a surface layer portion, more than does the conventional carbonitriding hardening, that is, carbonitriding followed by a single hardening. The rolling bearing of the invention produced by the heat treatment pattern of FIG. 12 or FIG. 13 has a microstructure in which the grain diameter of austenite crystal grains is not more than half of the conventional value. The bearing part subjected to the heat treatment has a long life in relation to rolling fatigue, having improved crack strength and reduced time-dependent dimensional change rate. The heat treatment in which the secondary hardening temperature is lowered to make the crystal grains finer reduces the amount of retained austenite both in the surface layer and in the interior, resulting in superior anti-crack strength and resistance to time-dependent dimensional change.

Figure 14A:
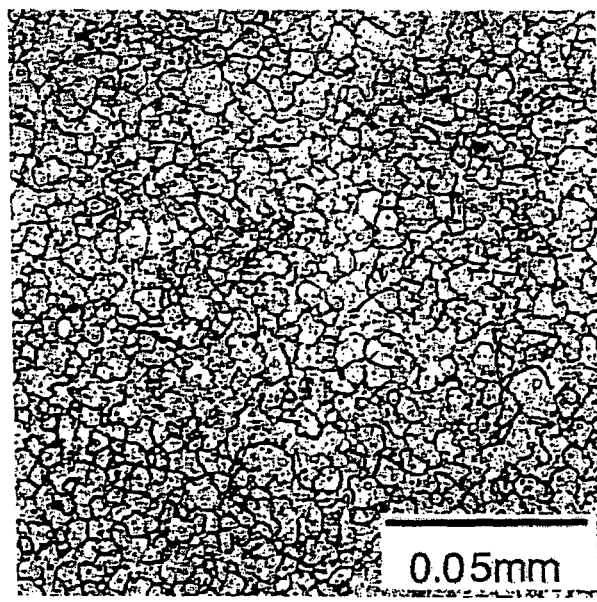
FIG. 14A is a metal structure diagram showing the microstructure, particularly the austenite grains of bearing parts in inventive examples.
Figure 14B:
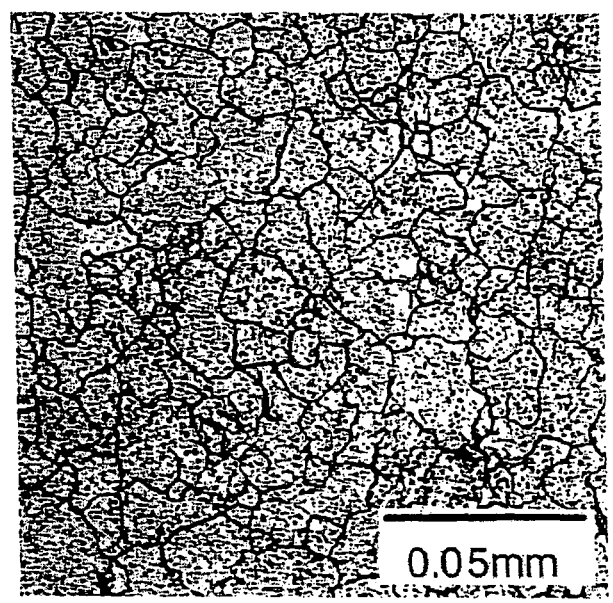
FIG. 14B is a metal structure diagram showing the microstructure, particularly the austenite grains of conventional bearing parts.

FIGS. 14A and 14B are views showing the microstructure, particularly austenite grains of the bearing part. FIG. 14 A shows the bearing part in an inventive example, and FIG. 14 B shows the conventional bearing part. That is, the austenite crystal grain size of the raceway ring of a rolling bearing which is an embodiment of the invention subjected to the heat treatment pattern shown in FIG. 12 is shown in FIG. 14A. Further, the austenite crystal grain size of bearing steel subjected to the conventional heat treating method is shown in FIG. 14 B for comparison purposes. Further, FIGS. 15 A and 15 B show the austenite crystal grain sizes which illustrate FIGS. 14 A and 14B. Because of the structure showing such austenite crystal grain size, the conventional austenite grain size is number 10 in terms of JIS (Japanese Industrial Standards), and according to the heat treating method shown in FIG. 12 or 13, fine grains having number 12 can be obtained. Further, the mean grain size of FIG. 14 A was microtomically examined and found to be 5.6 μm.

Embodiments of the invention will now be described.

Embodiment I

JIS SUSJ2 Material (1.0 wt % C-0.25 wt % Si-0.4 wt % Mn-1.5 wt % Cr) was used and (1) hydrogen quantity measurement, (2) crystal grain size measurement, (3) Charpy impact test, (4) breaking stress value measurement, and (5) rolling fatigue test were conducted. Table 4 shows the results thereof.

TABLE 4

| | Sample | | | | | | Conventional | Ordinary |
| | A | B | C | D | E | F | carbonitriding | hardening |
|---|---|---|---|---|---|---|---|---|
| Secondary hardening Temperature (° C.) | 780 | 800 | 815 | 830 | 850 | 870 | — | — |
| Hydrogen quantity (ppm) | — | 0.37 | 0.40 | 0.38 | 0.42 | 0.40 | 0.72 | 0.38 |
| Crystal grain size (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |

TABLE 4-continued

| | Sample | | | | | | Conventional carbonitriding | Ordinary hardening |
|---|---|---|---|---|---|---|---|---|
| | A | B | C | D | E | F | | |
| Breaking stress value (MPa) | — | 2840 | 2780 | 2650 | 2650 | 2700 | 2330 | 2770 |
| Rolling fatigue life Ratio ($L_{10}$) | — | 5.4 | 4.2 | 3.5 | 2.9 | 2.8 | 3.1 | 1 |

The production history of each sample is as follows.

Samples A-D (inventive examples): carbonitriding temperature, 850° C., holding time, 150 minutes. The atmosphere was a gas mixture of RX gas and ammonia gas. In the heat treatment pattern shown in FIG. 12, primary hardening was performed at a carbonitriding temperature of 850° C. and the samples were heated to a temperature range of 780° C.-870° C. which was lower than the carbonitriding temperature, so as to perform secondary hardening. However, the sample A heated to a secondary hardening temperature of 780° C. was excluded from the test because of its insufficient hardening.

Samples E and F (comparative examples): carbonitriding was performed with the same history as in the inventive examples A-D, and secondary hardening was performed at temperatures of 850° C.-870° C., which were above the carbonitriding temperature of 850° C.

Conventional carbonitrided article (comparative example): carbonitriding temperature, 850° C., holding time, 150 minutes. T*he atmosphere was a gas mixture of RX gas and ammonia gas. Hardening was performed at the carbonitriding temperature, with no secondary hardening.

Ordinarily hardened article (comparative example): hardening was performed by heating to 850° C., without carbonitriding. Secondary hardening was not performed.

Next, testing methods will be described.

(1) Measurement of Hydrogen Quantity

Hydrogen quantity was measured by DH-103 Model hydrogen analyzer made by LECO company; the non-diffusive hydrogen quantity in steel was measured. The diffusive hydrogen quantity was not measured. The specifications of this DH-103 Model hydrogen analyzer made by LECO company are shown below.

Analysis range: 0.01-50.00 ppm.
Analysis accuracy: ±0.1 ppm or ±3% H (the larger of the two)
Analysis sensitivity: 0.01 ppm.
Detection system: heat conductivity method.
Sample weight size: 10 mg-35 mg (maximum: 12 mm in diameter×100 mm in length).
Heating furnace temperature range: 50° C.-1100° C.
Reagent: Anhydron Mg $(ClO_4)_2$, askalight NaOH.
Carrier gas: nitrogen gas, gas dosing gas: hydrogen gas, each gas having a purity of not less than 99.99 and a pressure of 40 psi (2.8 $kgf/cm^2$).

An outline of the measuring procedures is as follows.

A sample taken by an exclusive sampler is put in the hydrogen analyzer, together with the sampler. The diffusive hydrogen in the interior is led into a heat conductivity detector by the nitrogen carrier gas. This diffusive hydrogen is not measured in this example. Next, the sample is taken out of the sampler and heated in a resistance heating furnace, and the non-diffusive hydrogen is led into the heat conductivity detector by the nitrogen carrier gas. In the heat conductivity detector, the heat conductivity is measured, whereby the non-diffusive hydrogen quantity can be found.

(2) Measurement of Crystal Grain Size

Crystal grain size was measured on the basis of the austenite crystal grain size measuring method for steel in JIS G 0551.

(3) Charpy Impact Test

Charpy impact tests were conducted on the basis of the Charpy impact testing method for metal materials in JIS Z 2202. The test piece used was a U-notched test piece (JIS No. 3 test piece) shown in JIS Z 2202.

(4) Measurement of Breaking Stress Value

FIG. 16 shows a test piece for static crush strength test (breaking stress value measurement). A load is applied in the P-direction in the figure and the loads are measured until break. Thereafter, the break load obtained is converted into a stress value by stress calculation formulas shown below for curved beams. In addition, the test piece is not limited to the one shown in FIG. 16, and test pieces of other shapes may be used.

Let $\sigma_1$ be the fiber stress in the convex surface of the test piece of FIG. 16, and $\sigma_2$ be the fiber stress in the concave surface thereof. Then, $\sigma_1$ and $\sigma_2$ can be found by the following formulas (Mechanical Engineering Handbook A4 Part, Strength of Materials A 4-40). Here, N is the axial force in a section including the axis of an annular test piece, A is the cross sectional area, $e_1$ is the inner radius, and $e_2$ is the outer radius. Further, κ is the section modulus for curved beams.

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 - e_2/\{\kappa(\rho_0 - e_2)\}]$$

$$\kappa = -(1/A)\int A\{\eta/(\rho_0 + \eta)\}dA$$

(5) Rolling Fatigue Life

Figure 17:
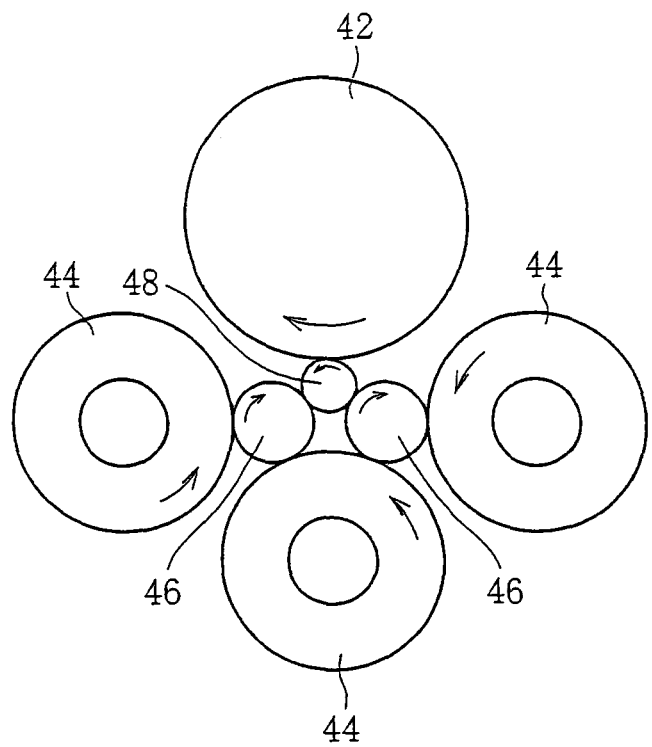
FIG. 17 is a schematic front view of a rolling fatigue life testing machine.
Figure 18:
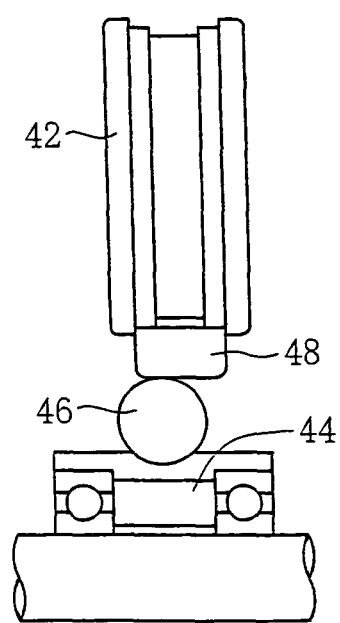
FIG. 18 is a schematic side view of the rolling fatigue life testing machine.

Test conditions for rolling fatigue life tests are shown in Table 2. Further, FIGS. 17 and 18 are schematic views of a rolling fatigue life testing machine. FIG. 17 is a front view and FIG. 18 is a side view. In FIGS. 17 and 18, a rolling fatigue life test piece 21 is driven by a drive roll 11 and is rotating in contact with a ball 13. The ball 13, which is a ¾ inch ball, is guided by a guide roll 12, and rolls with a high surface pressure exerted between the ball and the rolling fatigue life test piece 21.

The test results in the Embodiment I shown in Table 4 are as follows.

(1) Hydrogen Quantity

The conventional carbonitrided article just after being carbonitrided has as high a value as 0.72 ppm. This is believed to be due to decomposition of ammonia ($NH_3$) contained in the carbonitriding atmosphere to cause the hydrogen to enter the steel. In contrast, in the samples B-D, the hydrogen quantity has reduced to about half, being 0.37-0.40 ppm. This hydrogen quantity is on the same level as in the ordinarily hardened article.

The reduction of hydrogen quantity makes it possible to reduce brittleness of steel due to solid solution of hydrogen. That is, the reduction of hydrogen quantity has greatly improved the Charpy impact values of the inventive examples B-D.

(2) Crystal Grain Size

In the case where the secondary hardening temperature is lower than the hardening temperature during carbonitriding (primary hardening), that is, in the case of the samples B-D, crystal grain size has been remarkably made finer to the extent that the crystal grain size number is 11-12. The austenite grains of the samples E and F and of the conventional carbonitrided article and ordinarily hardened article have crystal grain size number 10, which shows that they are coarser than those of the samples B-D in the inventive examples.

(3) Charpy Impact Test

According to Table 4, whereas the Charpy impact value of the conventional carbonitrided article is 5.33 J/cm$^2$, the Charpy impact values of the samples B-D in the inventive examples are as high as 6.30-6.65 J/cm$^2$. Among these, those having lower secondary hardening temperatures tend to have higher Charpy impact values. The Charpy impact value of the ordinarily hardened article is as high as 6.70 J/cm$^2$.

(4) Measurement of Breaking Stress Value

The breaking stress value corresponds to anti-crack strength. According to Table 4, the conventional carbonitrided article has a breaking stress value of 2330 MPa. As compared with this, the breaking stress values of the samples B-D are improved, being 2650-2840 MPa. The breaking stress value of the ordinarily hardened article is 2770 MPa. The improved anti-crack strength of the samples B-D is presumed to be largely due to not only the austenite crystal grains being made finer but also the reduction of hydrogen content.

(5) Rolling Fatigue Test

According to Table 4, reflecting the absence of a carbonitrided layer in the surface layer, the ordinarily hardened article is lowest in rolling fatigue life $L_{10}$. As compared with this, the rolling fatigue life of the conventional carbonitrided article is 3.1 times. The rolling fatigue life of the samples B-D is remarkably improved over the conventional carbonitrided article. The samples E and F are substantially equal in this value to the conventional carbonitrided article.

To summarize, the samples B-D in the inventive examples are reduced in hydrogen content, made finer in austenite crystal grain size to the extent of not less than number 11, and improved in Charpy impact value, anti-crack strength, and rolling fatigue life.

Embodiment II

Embodiment II will be described. A series of tests were conducted on the following X-material, Y-material, and Z-material. The material to be heat-treated was JIS SUJ2 Material (1.0 wt % C-0.25 wt % Si-0.4 wt % Mn-1.5 wt % Cr), being common to the X-material-Z-material. The production history of each of the X-material-Z-material is as follows.

X-material (comparative example): ordinary hardening alone (no carbonitriding).

Y-material (comparative example): hardened just after carbonitriding (conventional carbonitriding hardening). Carbonitriding temperature was 845° C., and holding time was 150 minutes. The atmosphere for carbonitriding was RX gas+ ammonia gas.

Z-material (inventive example): a bearing steel having the heat treatment pattern of FIG. 10 applied thereto. Carbonitriding temperature was 845° C. and holding time was 150 minutes. The atmosphere for carbonitriding was RX gas+ ammonia gas. The final hardening temperature was 800° C.

(1) Rolling Fatigue Life

The test conditions and testing device for rolling fatigue life are as shown in Table 5 and FIGS. 17 and 18, as described above. The results of the rolling fatigue life tests are shown in Table 6.

TABLE 5

| Test piece | φ12 × L22 cylindrical test piece |
|---|---|
| Number of tests | 10 |
| Mating steel ball | ¾ inch (19.05 mm) |
| Contact surface pressure | 5.88 GPa |
| Loading speed | 46240 cpm |
| Lubricating oil | Turbine VG68 forced circulation oiling |

TABLE 6

| | Life (number of times of loading) | | |
|---|---|---|---|
| Material | $L_{10}$ (×10$^4$) | $L_{60}$ (×10$^4$) | $L_{10}$ ratio |
| X-material | 8017 | 18648 | 1.0 |
| Y-material | 24656 | 33974 | 3.1 |
| Z-material | 43244 | 69031 | 5.4 |

According to Table 6, the Y-material of the comparative example shows 3.1 times the $L_{10}$ life (the life such that one out of every ten test pieces breaks) of the X-material also of the comparative example subjected to ordinary hardening alone, exhibiting a long life effect due to carbonitriding. In contrast, the Z-material of the inventive example shows as long a life as 1.74 times that of the B-material and 5.4 times that of the X-material. The main factor for this improvement is believed to be due to microstructure being made finer.

(2) Charpy Impact Test

Charpy impact tests were conducted using U-notched test pieces by a method similar to said JISZ2242. The test results are shown in Table 7.

TABLE 7

| Material | Charpy impact value (J/cm$^2$) | Impact value ratio |
|---|---|---|
| X-material | 6.7 | 1.0 |
| Y-material | 5.3 | 0.8 |
| Z-material | 6.7 | 1.0 |

The Charpy impact value of the Y-material (comparative example) subjected to carbonitriding is not higher than that of the X-material (comparative example) subjected to ordinary hardening, but the Z-material shows a value equal to that of the X-material.

(3) Test for Static Breaking Toughness Value

Figure 19:
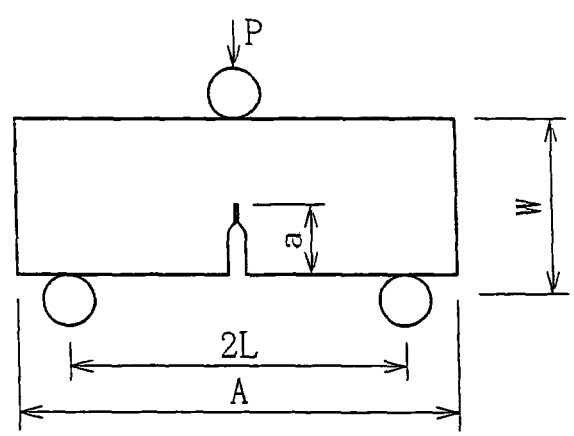
FIG. 19 is a plan view of a test piece for static breaking toughness tests.

FIG. 19 shows a test piece for static breaking toughness tests. An about 1 mm pre-crack fissure was made in the notched portion of this test piece, and a static load by 3-point bending was applied thereto to find the breaking load P. Formula (I) shown below was used to calculate the breaking toughness value ($K_{1C}$). Further, the test results are shown in Table 8.

$$K1_C = (PL\sqrt{a}/BW^2)\{5.8 - 9.2(a/W) + 43.6(a/W)^2 - 75.3(a/W)^3 + 77.5(a/W)^4\} \quad (I)$$

TABLE 8

| Material | Number of tests | $K_1C$ (MPa$\sqrt{m}$) | $K_1C$ ratio |
|---|---|---|---|
| X-material | 3 | 16.3 | 1.0 |
| Y-material | 3 | 16.1 | 1.0 |
| Z-material | 3 | 18.9 | 1.2 |

Because the pre-crack fissure depth has become greater than the carbonitrided layer depth, there is no difference between the X-material and Y-material of the comparative examples. However, The Z-material of the inventive example has obtained about 1.2 times the value of the comparative examples.

(4) Static Crush Strength Test

The static crush test piece used was one shown in FIG. 16. In the figure, a load was applied in the P-direction to conduct static crush strength tests. The results of the tests are shown in Table 9.

TABLE 9

| Material | Number of tests | Static crush strength (kgf) | Static crush strength ratio |
|---|---|---|---|
| X-material | 3 | 4200 | 1.00 |
| Y-material | 3 | 3500 | 0.84 |
| Z-material | 3 | 4300 | 1.03 |

The Y-material subjected to carbonitriding shows a value somewhat lower than that of the X-material subjected to ordinary hardening. However, the Z-material of the inventive example has improved in static crush strength over the Y-material and a level which compares favorably with that of X-material has been obtained.

(5) Time-Dependent Dimensional Change Rate

The results of measurements of time-dependent dimensional change rate at a holding temperature of 130° C. with a holding time of 500 hours are shown in Table 10 together with surface hardness, and retained austenite quantity (50 μm deep).

TABLE 10

| Material | Number of tests | Surface hardness (HRC) | Retained γ quantity (%) | Dimensional change rate ($\times 10^{-5}$) | Dimensional change rate ratio |
|---|---|---|---|---|---|
| X-material | 3 | 62.5 | 8.8 | 18 | 1.0 |
| Y-material | 3 | 63.6 | 30.5 | 35 | 1.9 |
| Z-material | 3 | 60.0 | 11.8 | 22 | 1.2 |

It is seen that as compared with the dimensional change rate of the Y-material having much retained austenite quantity, that of the Z-material of the inventive example is suppressed to be not more than half.

Embodiment III

Table 11 shows the results of tests conducted regarding the relation between nitrogen content and rolling life under inclusion of foreign matter. In this test, the tapered roller bearing shown in FIG. 8 was used. In examples 1-5, the outer ring 13, inner ring 14, and tapered rollers 16 are all produced according to the heat treatment pattern shown in FIG. 12. Further, the surfaces of the tapered rollers are randomly formed with an innumerable number of microconcave-like pits shown in Tables 1 and 2. In addition, a comparative example 1 is an article subjected to standard hardening, and a comparative example 2 is a standard carbonitrided article. A comparative example 3 contains excessive nitrogen although a treatment similar to that for the inventive example is applied thereto. The testing conditions are as follows.

Sample bearing: tapered roller bearing 30206 (inner and outer rings and rollers are made of High Carbon Chromium Bearing Steel Class 2 (SUJ2) in JIS).
Radial load: 17.64 kN.
Axial load: 1.47 kN.
Rotative speed: 2000 rpm.
Hard foreign matter inclusion 1 g/L.

TABLE 11

| No. | Nitrogen content (%) | Retained austenite (%) | Hardness (Hv) | Rolling life under inclusion of foreign matter | Austenite crystal grain size | Remarks |
|---|---|---|---|---|---|---|
| 1 | 0.11 | 14 | 725 | 321 | 11.8 | Example 1 |
| 2 | 0.16 | 18 | 735 | 378 | 12.0 | Example 2 |
| 3 | 0.18 | 20 | 730 | 362 | 11.9 | Example 3 |
| 4 | 0.32 | 22 | 730 | 396 | 12.1 | Example 4 |
| 5 | 0.61 | 24 | 715 | 434 | 12.2 | Example 5 |
| 6 | 0 | 8 | 770 | 72 | 9.8 | Comparative example 1 |
| 7 | 0.32 | 32 | 710 | 155 | 10.0 | Comparative example 2 |
| 8 | 0.72 | 31 | 700 | 123 | 12.0 | Comparative example 3 |

It is seen from Table 11 that in the examples 1-5, nitrogen content and foreign matter life are substantially in proportional relation to each other. In the case of the comparative example 3 whose nitrogen content is 0.72, the rolling life under inclusion of foreign matter is extremely low; in the light of this fact, it is recommendable that the upper limit of nitrogen content be 0.7.

It is to be understood that the examples disclosed herein are all for illustrative purposes only and should not be taken to be restrictive. The scope of the invention is defined, not by the description given above, but by the appended claims. All changes and modifications equivalent to those included in the scope of the invention are to be included in claims.

FIELD OF INDUSTRIAL APPLICATION

Air Conditioner Compressor Bearing

Figure 20:
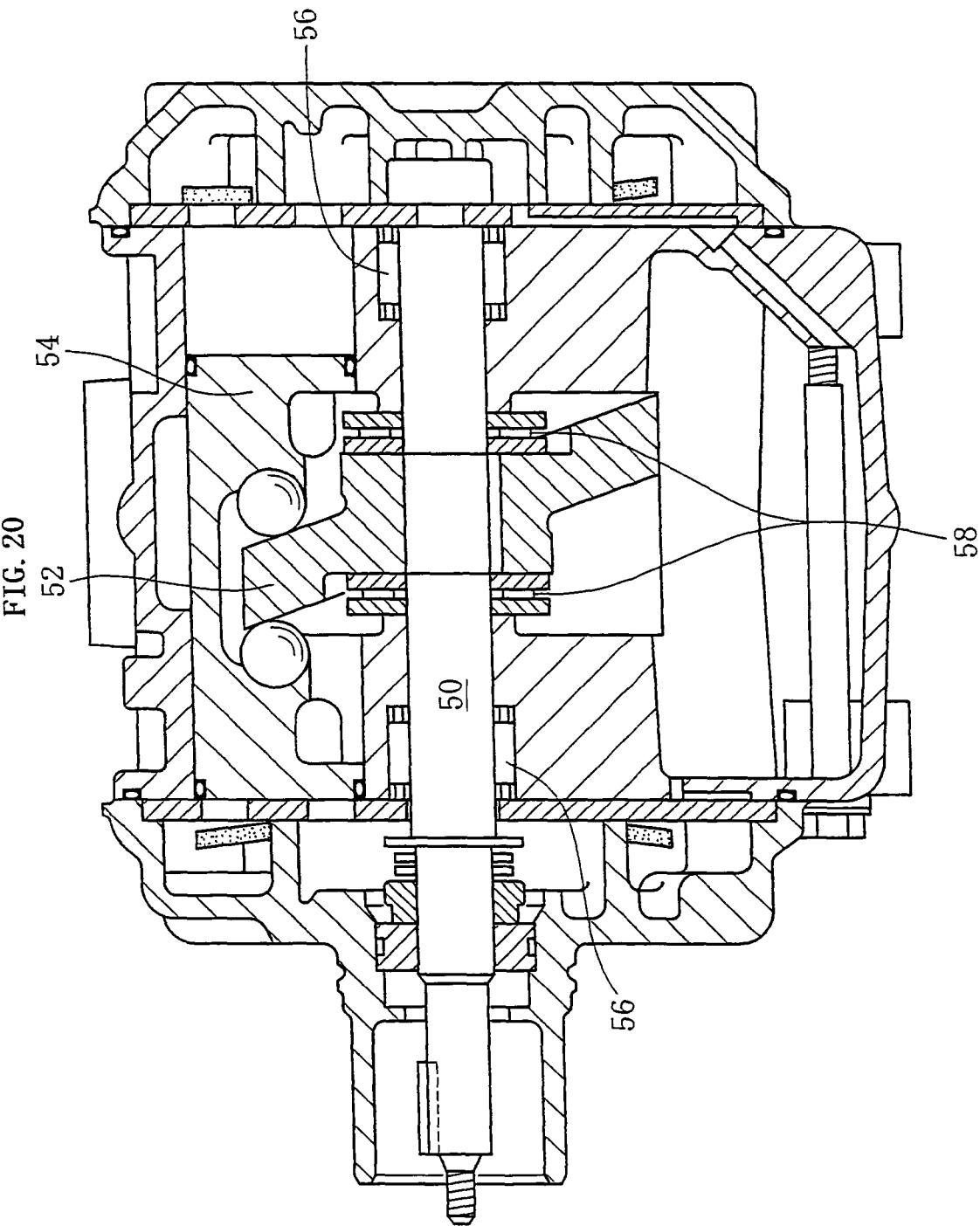
FIG. 20 is a longitudinal sectional view of a double swash plate type compressor.
Figure 21:
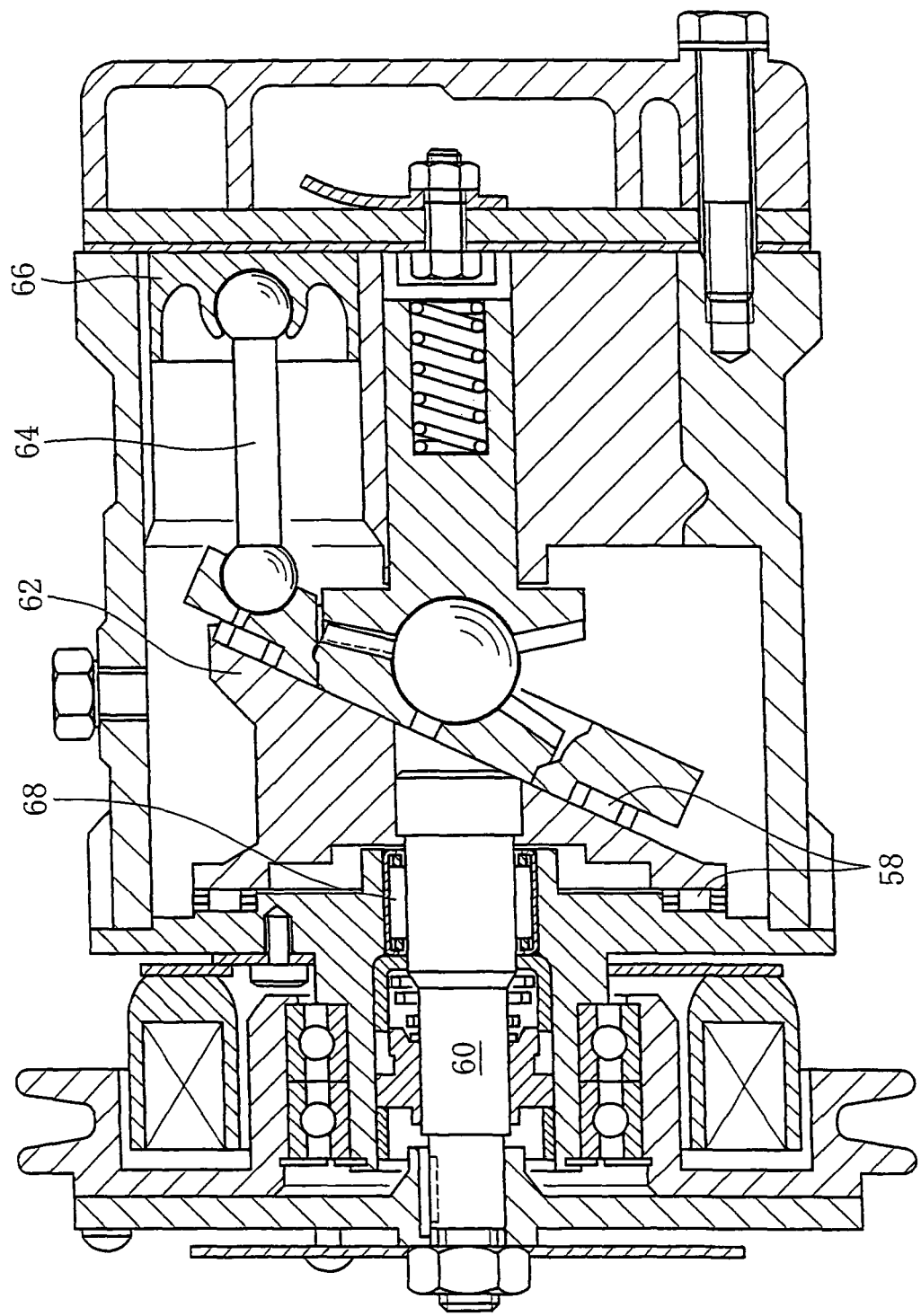
FIG. 21 is a longitudinal sectional view of a single swash plate type compressor.
Figure 22:
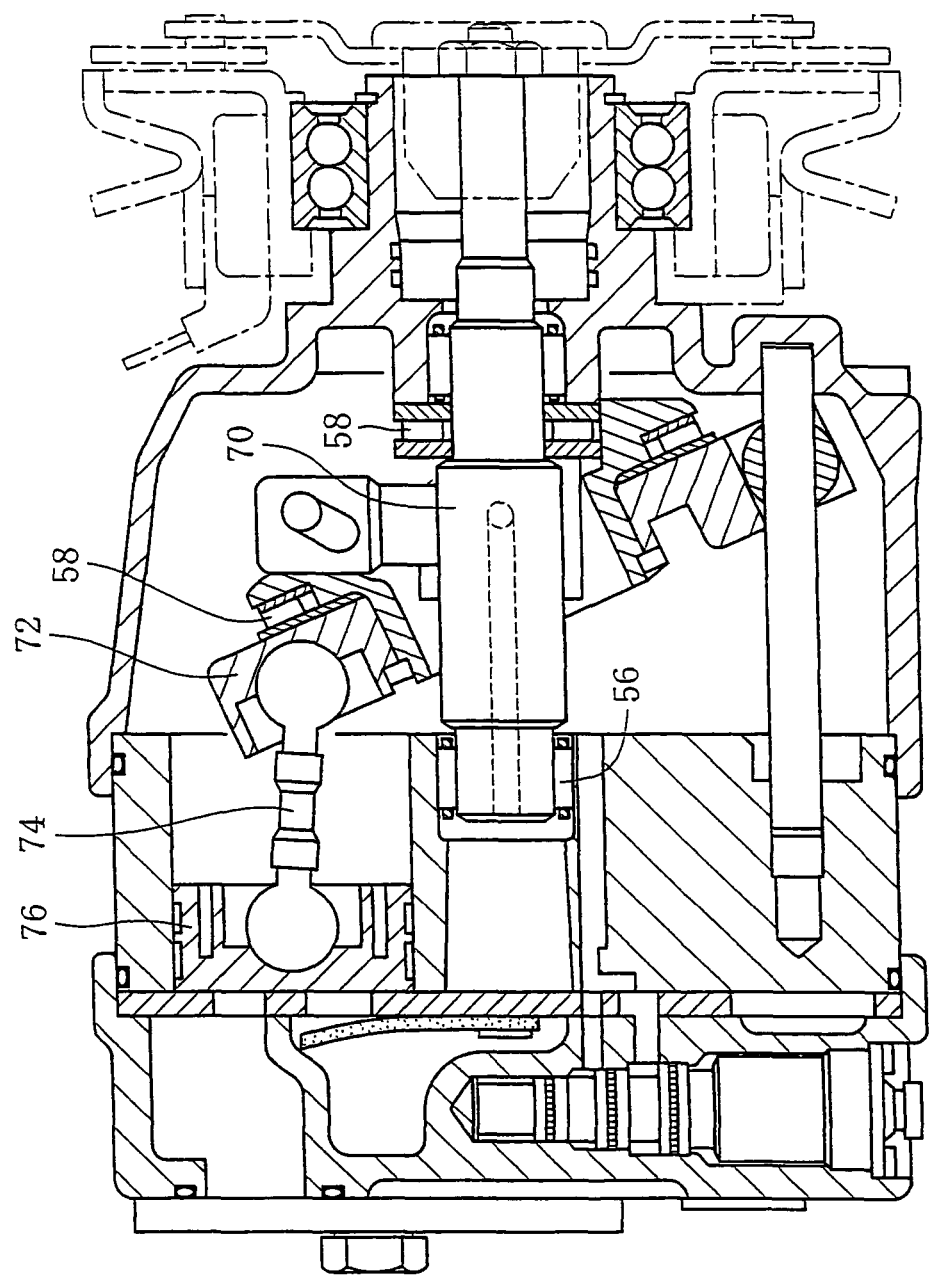
FIG. 22 is a longitudinal sectional view of a variable capacity, single swash plate type compressor.

There are various types of air conditioner compressors, including a double-sided swash plate type as shown in FIG. 20, in which a piston 54 is reciprocated by a double-sided swash plate 52 fixed to an input rotary shaft 50; a single-sided swash plate type as shown in FIG. 21, in which a piston 66 is reciprocated through a rod 64 by a single-sided swash plate 62 fixed to an input shaft 60; and a variable capacity single-sided swash plate type as shown in FIG. 22, in which a piston 76 is reciprocated through a rod 74 by a swash plate 72 angle-changeably attached to an input rotary shaft 70. There are scroll type and vane type also. Each type has a rolling bearing incorporated into a rotary portion. Specifically, in the case of the double-side swash plate type of FIG. 20, a cage-equipped needle roller bearing 56 and a thrust needle roller bearing 58 are used. In the single-sided swash plate type of FIG. 21, a shell type needle roller bearing 68 and a thrust needle roller bearing 58 are used. In the variable capacity single-sided swash plate type of FIG. 22, a cage-equipped needle roller bearing 56 and a thrust needle roller bearing 58 are used.

In compressors used in air conditioners described above, the interior is in a state in which a lubricant and a refrigerant for the bearings are mixed. Liquefaction and gasification of the lubricant are repeated by compression and expansion of the compressor, which means severe bearing oiling conditions as compared with ordinary operating oil or the like. In the bearings used in the compressor of an air conditioner, because of the mixing-in of the refrigerant and decreased quantity of the lubricant, the state of lubrication is bad as compared with ordinary operating oil, and peeling damage occurs in the rolling surfaces, causing the problem of premature abrasion.

Bearing for Planetary Gear Devices

Cage-equipped rollers are composed of rollers, which are rolling elements, and a cage, and a construction in which a housing for the rockers and outer ring, and a shaft which serves as an inner ring are in linear contact with each other, provides the advantage that high load capacity and high rigidity are obtained for a limited space. Therefore, this construction is suitable for a bearing to be used under severe usage conditions, including eccentric rotation or planetary motion under high load conditions, and is used as a bearing for supporting radial load in a planetary gear device.

Figure 23:
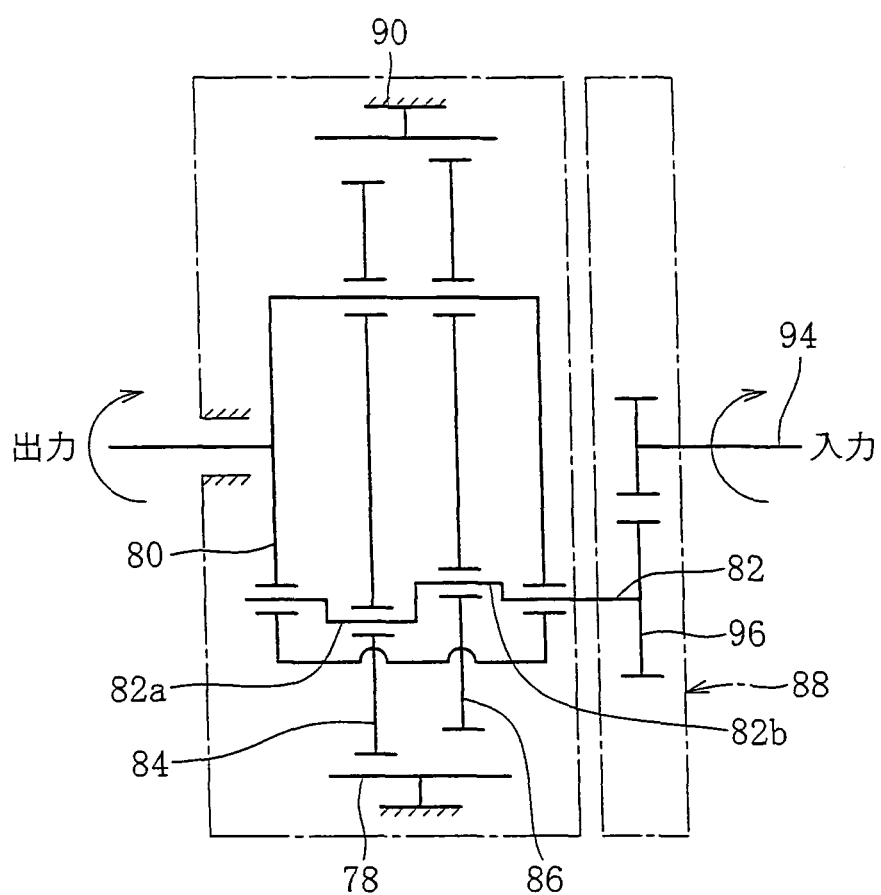
FIG. 23 is a schematic view of an example of a planetary speed reducer.
Figure 24:
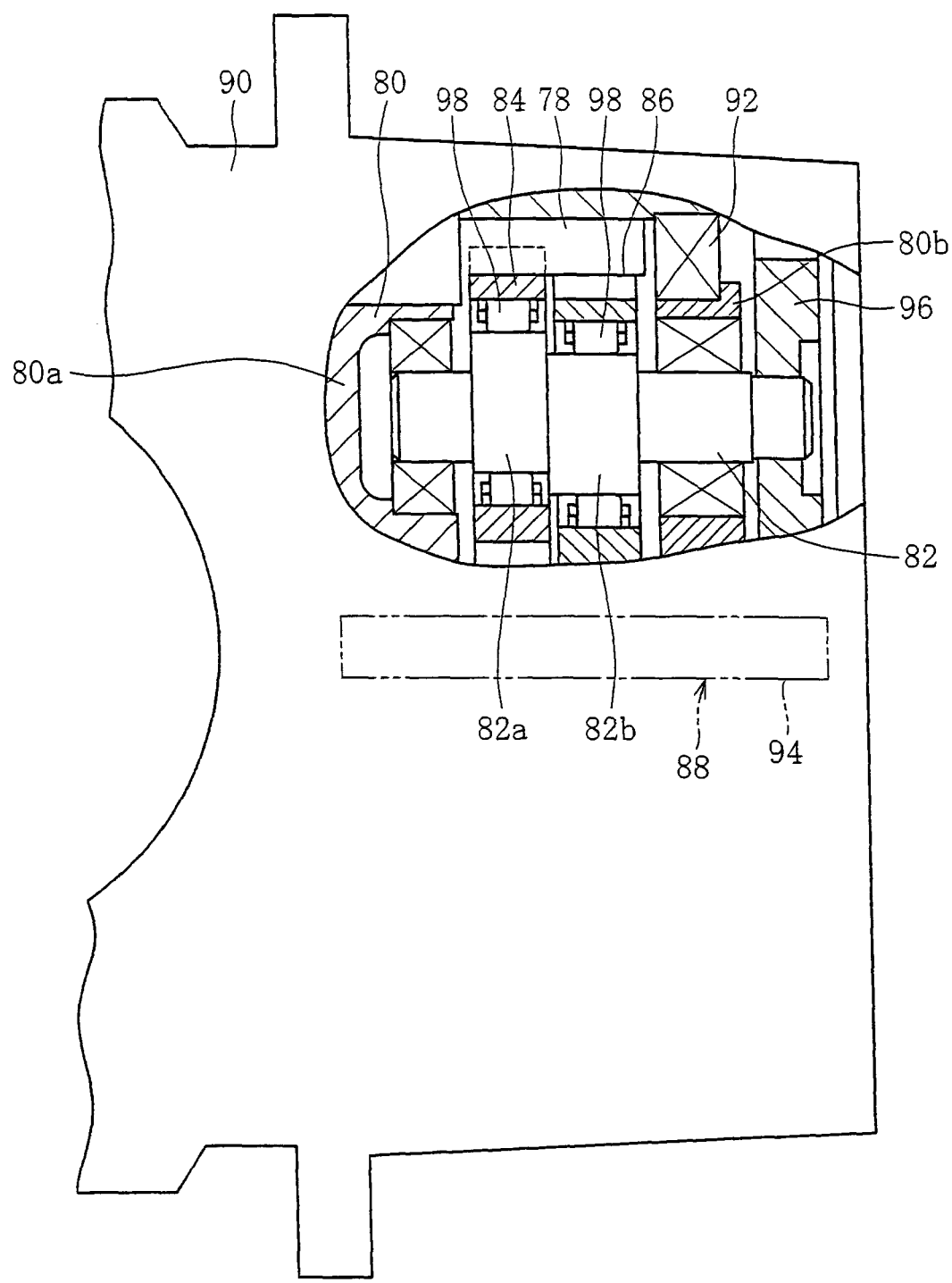
FIG. 24 is a schematic partial sectional view of the planetary speed reducer of FIG. 23.

FIGS. 23 and 24 show a speed reducer as an example of a planetary gear device. This planetary gear device comprises a ring gear 78 which is an internally-toothed sun gear, a carrier 80 serving as a rotation output section, a crank shaft 82 which is a support shaft rotatably supported by said carrier 80 and having a plurality of adjacent eccentric shaft sections 82a and 82b, a plurality of planet gears 84 and 86 rotatably mounted on the eccentric shaft sections 82a and 82b of this crank shaft 82 and meshing with the ring gear 78, and a rotation input section 88 for inputting rotation to the crank shaft 82. The ring gear 78 is fixed to a housing 90. The carrier 80 is composed of an input shaft 94 concentric with the gear 78 so as to be rotatable concentrically with the ring gear 78, and a transfer gear 96 mounted on each crank shaft 82 and meshing with the gear section of the input shaft 94. The crank shafts 82 are disposed at a plurality of places (for example, 3 places) circumferentially of the carrier 80. The planet gears 84 and 86, as shown in FIG. 24, are installed in the eccentric shaft sections 82a and 82b of the crank shaft 82 through cage-equipped rollers 98. As the cage-equipped rollers 94, use is made of, for example, a needle roller bearing in the form of the embodiment shown in FIG. 1.

The operation of this planetary gear device will now be described. When the input shaft 94 at the center is rotated, the three crank shafts 82 are rotated synchronously with each other through the transfer gears 96. Here, the first stage speed reduction is effected. The crank shaft 82 and the planet gears 84 and 86 are connected to each other through the cage-equipped rollers 98. The whirling of the crank shaft 82 synchronizes with the resultant motion of planetary rotation and own-axis rotation of the planet gears 84 and 86 rotating along the inner side of the internally-toothed ring gear 78. The two axially juxtaposed planet gears 84 and 86 make orbital rotation around the ring gear 78, which is the internally-toothed sun gear, with a 180° phase shift relative to each other. Therefore, the inertial forces due to the whirling of the two planet gears 84 and 86 cancel each other. The internally-toothed ring gear 78 is fixed, and the planet gears 84 and 86 rotate around the inner periphery of the internally-toothed ring gear 78. The three crank shafts 82 are disposed between the two disk sections 80a and 80b of the carrier 80 serving as an output member. Therefore, the orbital rotation of the planet gears 84 and 86 reaches the carrier 80 through the orbital rotation of the crank shaft 82, thus providing rotary movement of reduced speed.

In the planetary gear device of this arrangement, a large radial load acts on the cage-equipped rollers 98 interposed between the planet gears 84, 86 and the crank shaft 82, and the installation spacer of the cage-equipped rollers 98 is limited in space in order to avoid upsizing of the entire support structure.

Thus, the roller bearing of the invention (cage-equipped rollers 98) is applied to the planetary gear device of the crank shaft type, whereby a large load capacity is obtained within the limited space of the cage-equipped rollers 98. The advantage of being superior in oil run ensures that even if the cage-equipped rollers 98 are used under severe conditions which produce eccentric-movement under high load conditions, which is a feature of the planetary gear support, there will be no problems of surface damage or abrasion of the needle rollers 2 (FIG. 1) or of the crank shaft 82, and overheating of the needle rollers 2 due to metal contact between the needle rollers 2, shaft 82, and planet gears 84, 86, is avoided, so that durability can be improved.

Figure 25:
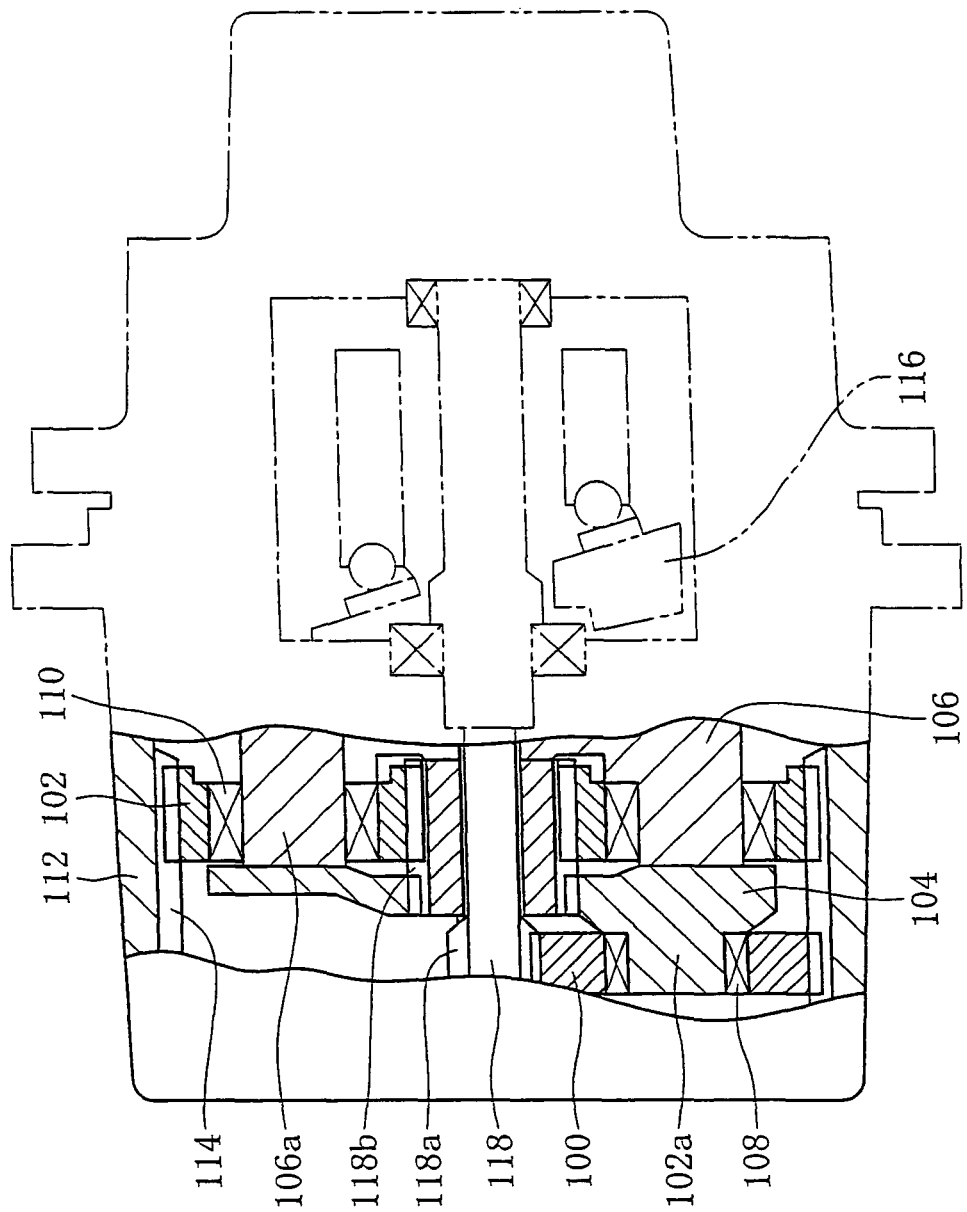
FIG. 25 is a schematic partial sectional view of another example of a planetary gear device.

FIG. 25 shows a planetary gear device with single rows of planet gears 100 and 102 disposed in two carriers 104 and 106, respectively. The same figure is a view for showing the relation between the planet gears 100, 102 and the carriers 104, 106, with part of the arrangement serving as the planetary gear device being omitted. The planet gear 100 is disposed, through cage-equipped rollers 108, on a support shaft 104a provided on the first carrier 104. Such planet gears 100 are disposed at 3 places equispaced circumferentially of the carrier 104. The other planet gear 102 is provided in the second carrier 106 and disposed on a support shaft 106a through cage-equipped rollers 110. Such planet gears 102 are disposed at 4 places equispaced circumferentially of the carrier 106. The rollers in the respective cage-equipped rollers 108 and 110 roll on the planet gears 100 and 102 and on the outer diameter surfaces of the support shafts 104a and 104b. The planet gears 100 and 102 mesh with the internally-toothed sun gear 114 disposed in the casing. Further, one planet gear 100 meshes with a first externally-toothed sun gear 118a disposed on a rotary shaft 118, and the other planet gear 100 meshes with a second externally-toothed sun gear 118b disposed on the rotary shaft 118. The carriers 104 and 106 are rotatably disposed concentrically with the internally-toothed sun gear 114. As the cage-equipped rollers 108 and 110, use is made of, for example, a needle roller bearing in the form of the embodiment shown in FIG. 1. In addition, this planetary gear device is incorporated into a swash plate type axial plunger pump and used for driving the swash plate 116 to drive the pump section.

In the case where the planetary speed reducer bearing of the invention is used as the cage-equipped rollers 108, 110 in the planetary gear device of such arrangement, the advantage of being high in load capacity, and being superior in oil run and durability can be effectively developed.

Figure 26:
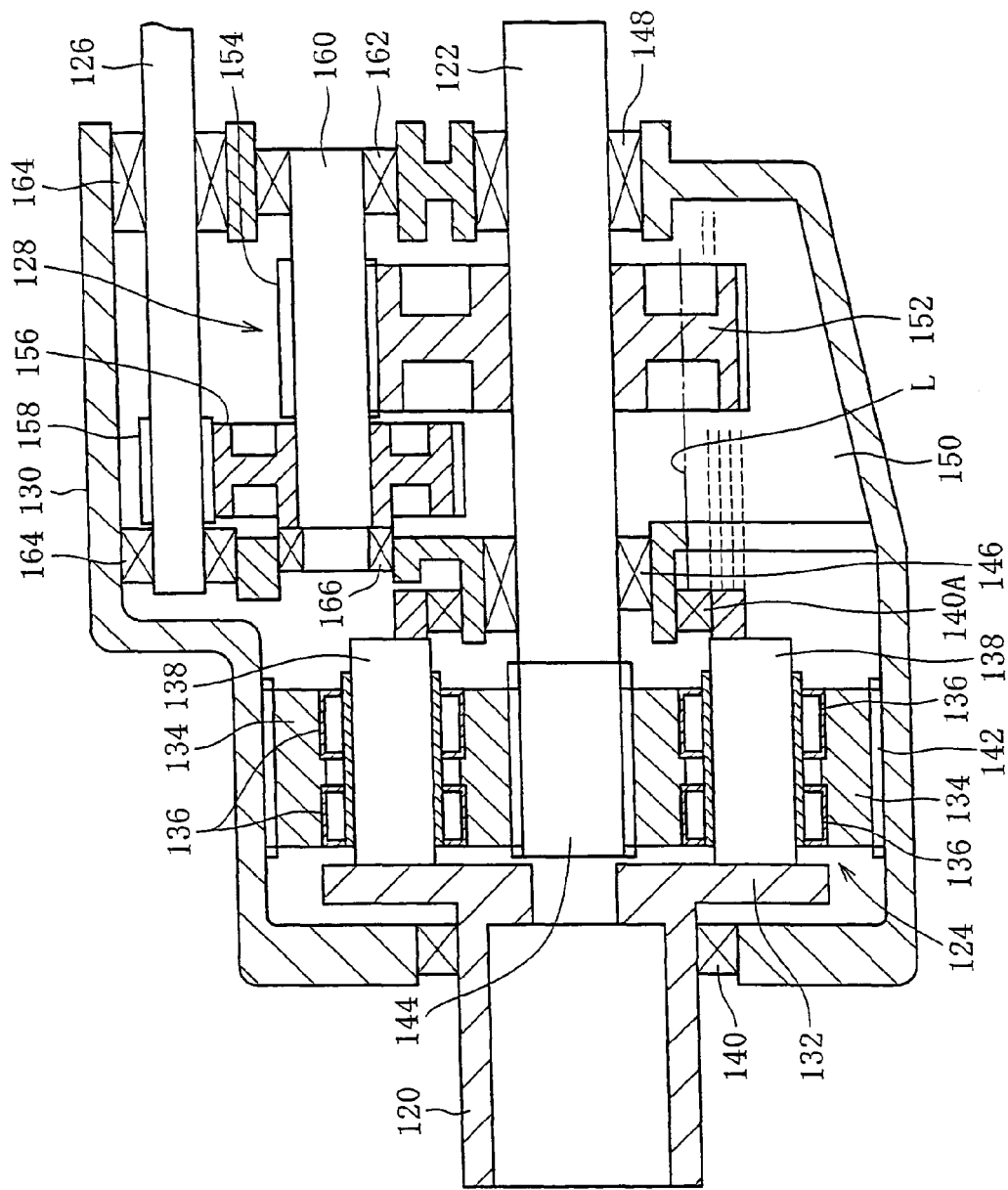
FIG. 26 is a longitudinal sectional view showing an aerogenerator speed-up mechanism provided with a planetary gear device.
Figure 27:
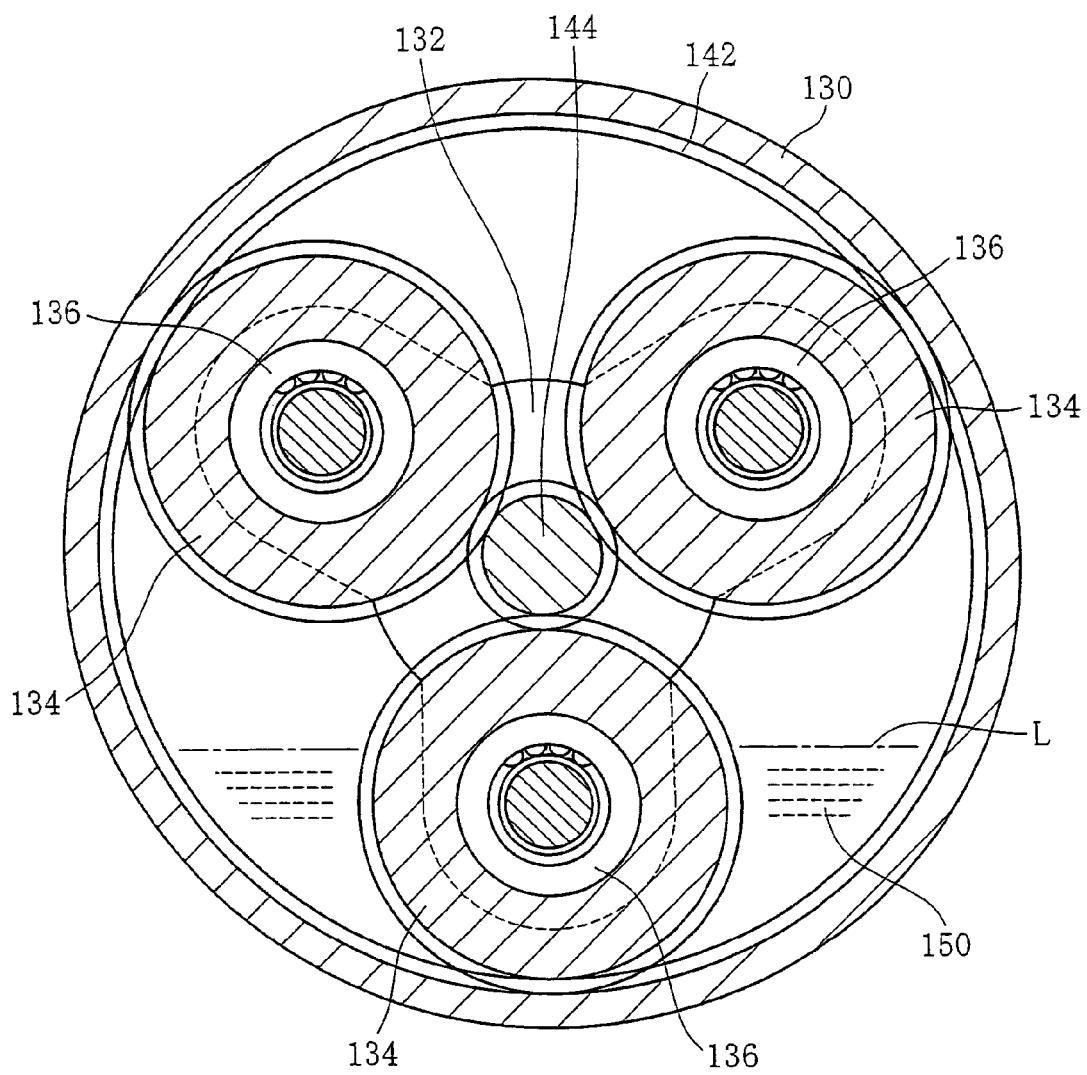
FIG. 27 is a cross sectional view of the planetary gear device in the speed-up mechanism of FIG. 26.

FIGS. 26 and 27 show another example of a planetary gear device. FIG. 26 shows an aerogenerator speed-up mechanism provided with a planetary gear device. This speed-up mechanism comprises a planetary gear device 124 for speeding up the rotation of an input shaft 120 to transmit it to a low speed shaft 122, and a secondary speed-up device 128 for further speeding up the rotation of the low speed shaft 122 to transmit it to an output shaft 126. The planetary gear device 124 and the secondary speed-up device 128 are installed in a common casing 130. The input shaft 120 is connected to the main shaft of a windmill (not shown) or the like, while the output shaft 126 is connected to a power generator (not shown).

The planetary gear device 124 is provided with support shafts 138 in a plurality of places circumferentially of a revolvable carrier 132. Each support shaft 138 rotatably supports a planet gear 134 through cage-equipped rollers 136. The cage-equipped rollers 136 of each planet gear 134 are disposed in two juxtaposed rows in the illustrated example, but a single row may be used. The carrier 132, which is a member serving as an input section in the planetary gear device 124, is integral with the input shaft or integrally joined thereto. The carrier 132 is revolvably supported on the input shaft 120 in the casing 130 through a bearing 140. The planet gears 134 supported by the carrier 132 mesh with a ring gear 142, which is an internally-toothed sun gear, disposed in the casing 130 and also mesh with a sun gear 144 disposed concentrically with the ring gear 142. The ring gear 142 may be one formed directly on the casing 130 or one fixed to the casing 130. The externally-toothed sun gear 144, which is a part to serve as an input section in the planetary gear device 124, is installed on the low speed shaft 122. The low speed shaft 122 is rotatably supported in the casing 130 through bearings 146 and 148.

The secondary speed-up device 128 is composed of a gear train. In the illustrated example, the secondary speed-up device 128 has a gear train such that a gear 152 fixed to the low speed shaft 122 meshes with a gear 154 of small diameter on an intermediate shaft 160 and a gear 156 of large diameter disposed on the intermediate shaft 160 meshes with a gear 158 on the output shaft 126. The intermediate shaft 160 and output shaft 126 are rotatably supported in the casing by bearings 162 and 164, respectively.

The bottom of the casing 130 has a portion which forms an oil bath 150 for lubricating oil. The oil level L of the oil bath 150 has a height such that the cage-equipped rollers 136 supporting the planet gears 134 come in and out by the action of the revolution of the carrier 132. As the cage-equipped rollers 136 supporting each planet gear 134, use is made of, for example, the planetary speed reducer bearing in the form of the embodiment shown in FIG. 1.

The operation of the above arrangement will now be described. When the input shaft 120 rotates, the carrier 132 integral with the input shaft 120 revolves, and the planet gears 134 supported in a plurality of places on the carrier 132 make orbital rotational travel. At this time, the individual planet gears 134 make orbital rotation while meshing with the fixed ring gear 142, so that own-axis rotation of each planet gear 134 is produced. The externally-toothed sun gear 144 is meshing with the planet gears 134 making own-axis rotation while making orbital rotation; therefore, the sun gear 144 is disposed on the low speed shaft 122 of the secondary speed-up device 128, and the rotation of the sun gear 144 is sped up by the secondary speed-up device 128 and transmitted to the output shaft 126. Thus, the rotation of a windmill main shaft (not shown) inputted into the input shaft 120 is greatly sped up by the planetary gear device 124 and secondary speed-up device 128 and transmitted to the output shaft 126. Therefore, even when the windmill rotates at very slow speed depending on wind power status, a high speed rotation capable of power generation can be obtained from the output shaft 126.

Lubrication of the cage-equipped rollers 136 supporting the individual planet gears 134 is effected as follows. The planet gears 124 and the cage-equipped rollers 136 are immersed in the oil bath 150 when they are positioned in the bottom during their orbital rotation as the carrier 132 revolves, so that lubricating oil is fed thereto.

Thus, in the case where the speed reducer bearing in the form of the embodiment shown in FIG. 1 is applied to the planetary gear device 124 for speed up, the advantage of being high in load capacity, and being superior in oil run and durability can be effectively developed.

Figure 28:
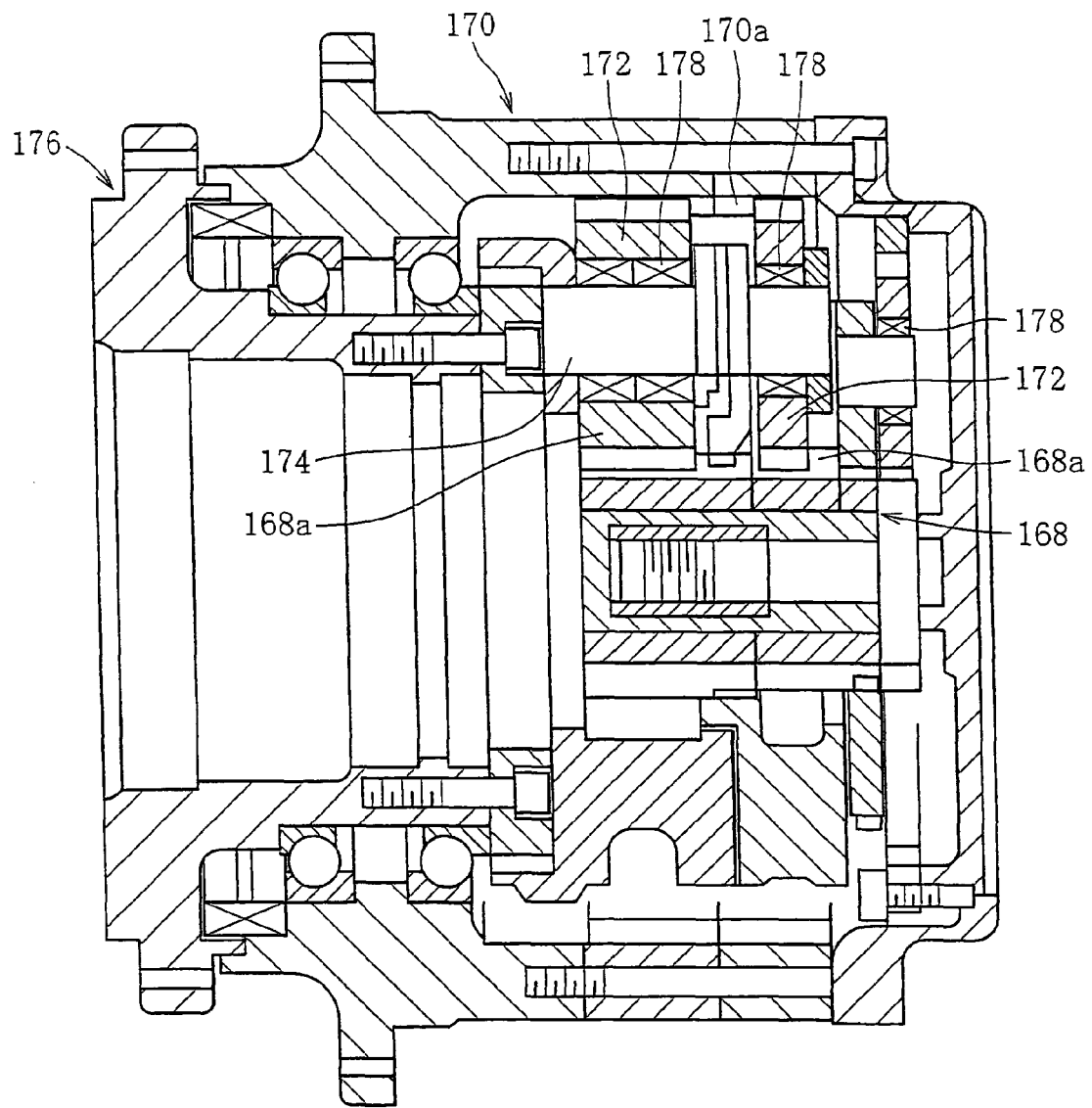
FIG. 28 is a longitudinal sectional view of the planetary gear device.

FIG. 28 shows another example of a planetary gear device. Between an externally-toothed sung gear 168a disposed in the outer periphery of an input member 168 and an internally-toothed sung gear 170a disposed in the inner periphery of a casing 170 are interposed a plurality of planet gears 172 at circumferentially equispaced intervals, meshing with both of the sun gears 170a and 168a. The individual planet gears 172 are rotatably supported on support shafts 174 through cage-equipped rollers 178, the support shafts 174 being fixed to output members 176 which serve as carriers.

When the input member 168 rotates, the planet gears 172 meshing with the sun gear 168a in the outer periphery thereof make orbital rotation around the axis of the input member 168 with each planet gear 172 making own-axis rotation around the axis of the support shaft 174. The orbital rotational motion of the planet gears 172 is converted into the rotary movement of the output member 176 through the support shafts 174, so that the output member is rotated at a speed reduced with a predetermined speed reduction ratio.

In the case of the planetary gear device of this arrangement also, the use of the planetary speed reducer bearing of the invention as the cage-equipped rollers 178 ensures that the advantage of being high in load capacity, and being superior in oil run and durability can be effectively developed. In addition, the cage-equipped rollers 178 supporting the planet gears 172 for rotation relative to the support shafts 174 are lubricated by the lubricating oil in the casing 170. The lubricating oil in the casing 170, however, contains foreign matter, such as gear wear powder, tending to easily cause the problem of decreasing bearing life due to foreign matter residence and obstruction of passage of lubricating oil. The superior oil run property of the cage-equipped rollers 178 of the above arrangement, however, eliminates such problem about lubrication, making it possible to prolong the life of the bearing section.

Bearing for Engine Rocker Arms

In improving the durability of valve-moving systems for engines to realize a maintenance-free valve moving system, lubrication and wear of a cam on a cam shaft and a contactor (a rocker arm or tappet) have become problems. As measures against valve clearance due to the wear of the valve moving system, a hydraulic valve lash adjuster has been put to practical use for OHV type engines, while the rolling of the contactor has been rapidly employed to take measures against the wear of the cam and contactor, aiming at the lowering of friction loss.

In this connection, the cam portion, among other engine parts, is subjected to severe conditions from the standpoint of lubrication, and the contact surface is referred to as the boundary lubrication region. Bearings to be used under such conditions, though basically in rolling contact, are incapable of pure rolling motion due to rotational speed variation of the outer ring of the bearing or sharp variation of bearing load caused by the cam shape, so that the bearings are in rolling contact involving slippage, and peeling phenomenon or the like occurs in the bearings depending on lubricating conditions (oil quantity, oil temperature, foreign matter), sometimes resulting in the shortening of the bearing life.

Figure 29:
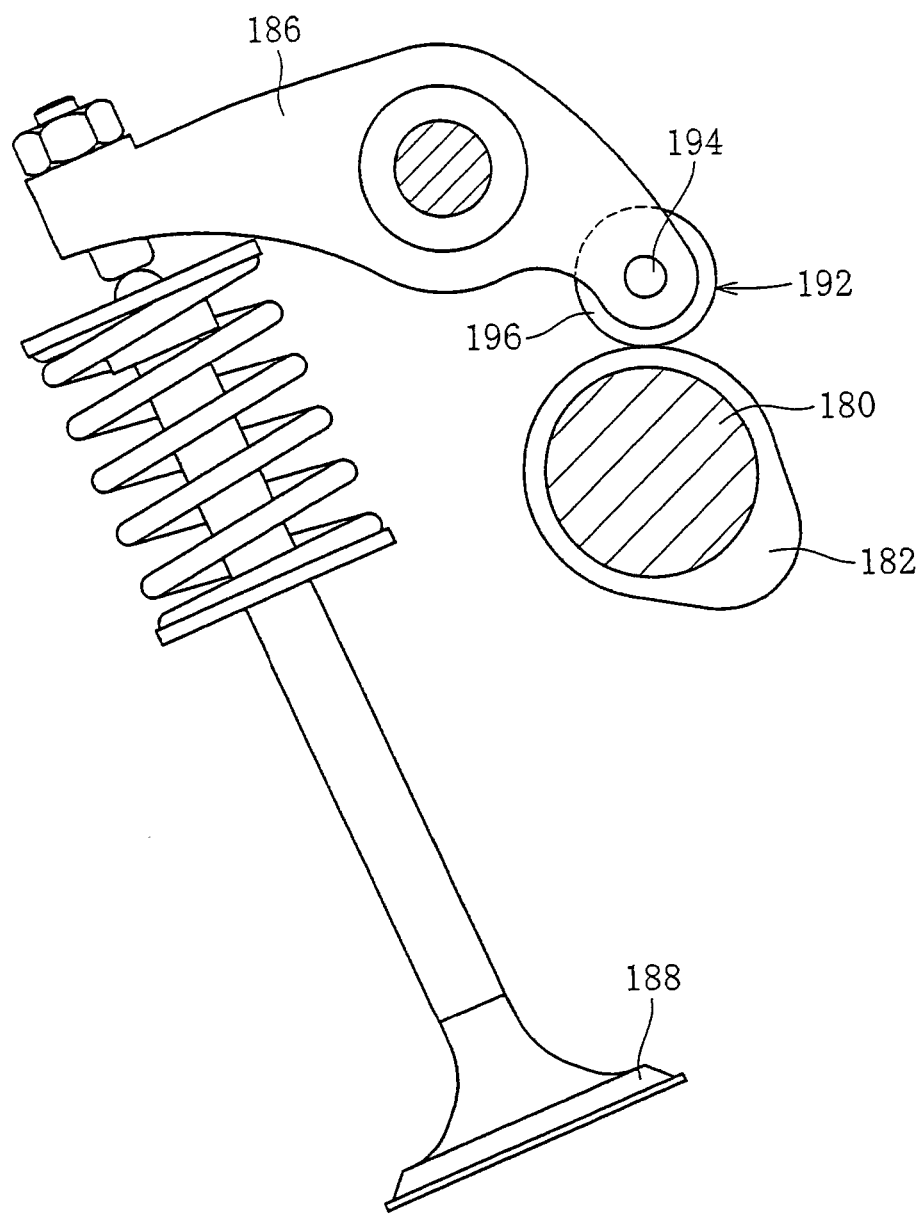
FIG. 29 is a longitudinal sectional view of an engine rocker arm bearing.
Figure 30:
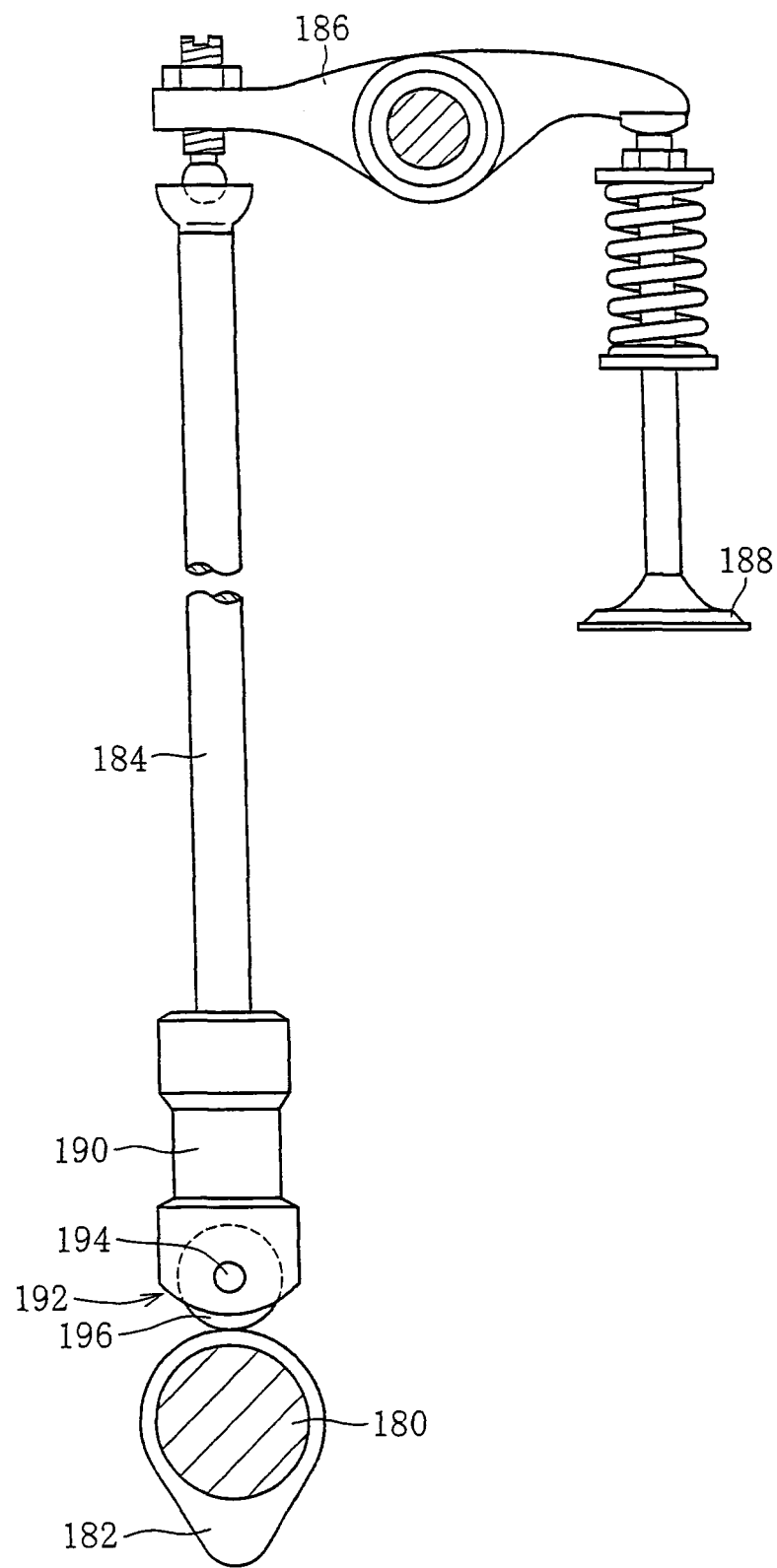
FIG. 30 is a cross sectional view of the bearing of FIG. 29.
Figure 31:
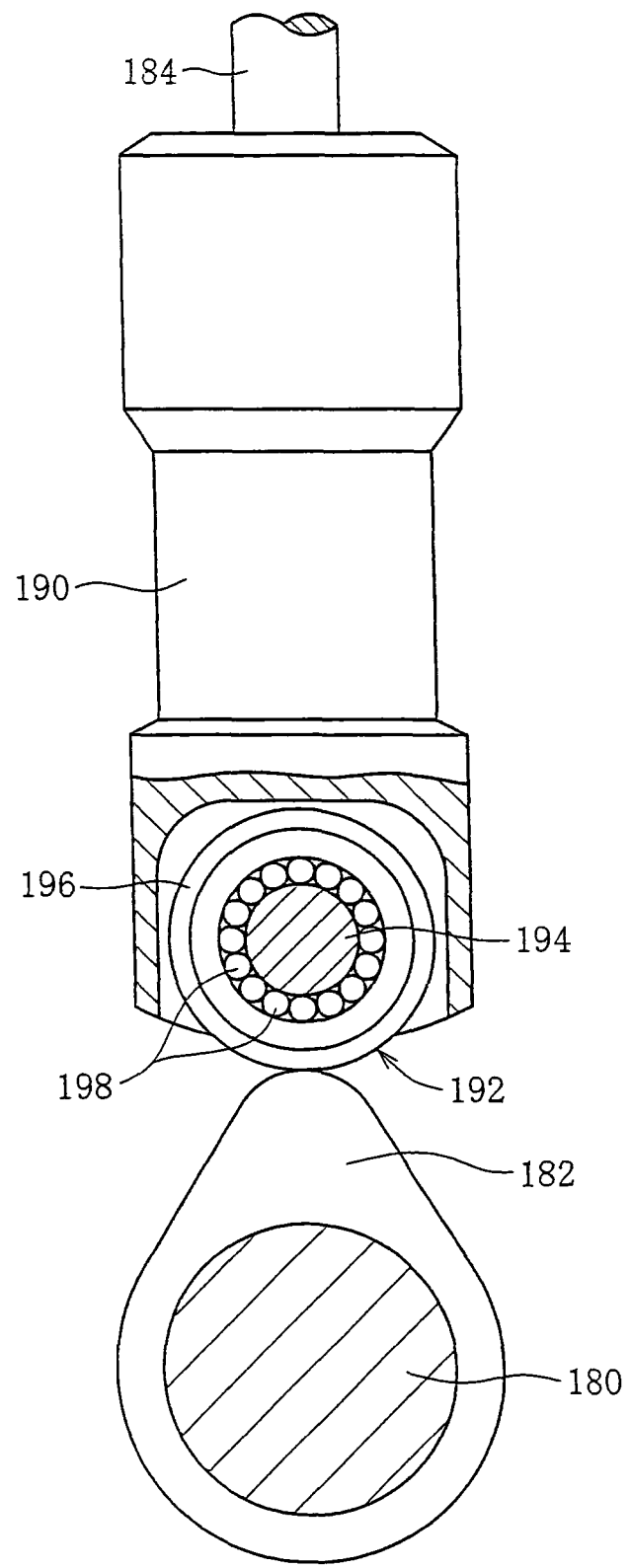
FIG. 31 is a front view of a valve moving system for OHC engines.

First, FIGS. 29 through 31 show the to-be-used portion of a rocker arm actuation bearing in an engine. FIG. 29 shows an example of an OHC type engine, in which a cam 182 on a cam shaft 180 is adapted to directly swing a rocker arm 186, the swing movement of which opens and closes a valve 188. Attached to the end of the rocker arm 186 which faces the cam 182 is a bearing 192 adapted to come in rolling contact with the peripheral surface of the cam 182. FIGS. 30 and 31 show an example of an OHV type engine, in which the upper end of a push rod 184 vertically moved by the cam 182 on the cam shaft 180 is engaged with the rocker arm 186, so that the swinging rocker arm 186 opens and closes the valve 188. Attached to the lower end of a hydraulic valve lash adjuster 190 disposed at the lower end of push rod 184 is a bearing 192 adapted to come in rolling contact with the peripheral surface of the cam 182.

Figure 32:
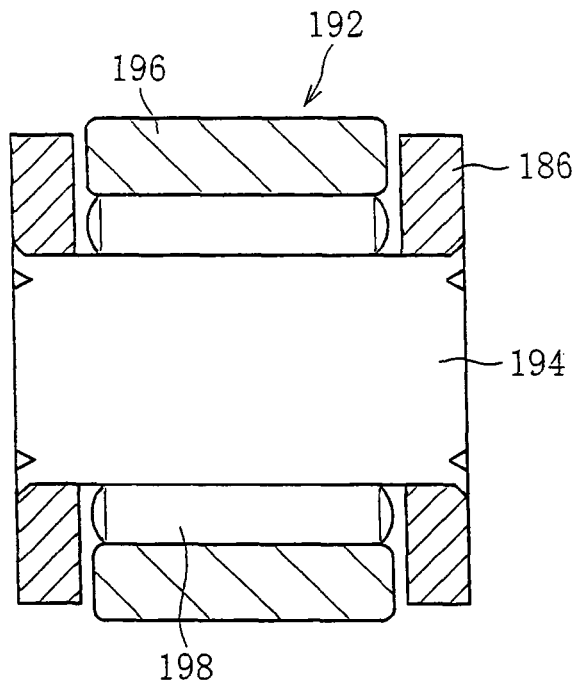
FIG. 32 is a front view of a valve moving system for OHV engines.
Figure 33:
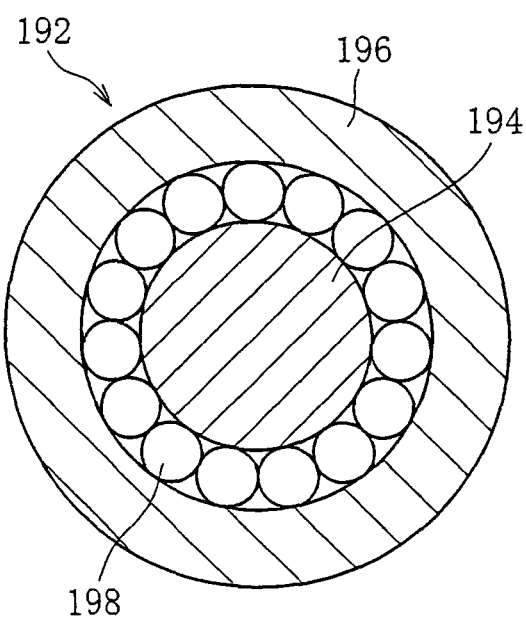
FIG. 33 is a partial enlarged sectional view of FIG. 32.

The bearing 192, as shown enlarged in FIGS. 32 and 33, is of an all-roller type in which an outer ring 196 is fitted on a support shaft 194 through needle rollers 194, and an inner ring is omitted and instead the outer peripheral surface of the support shaft 194 serves as a raceway surface. In addition, FIGS. 32 and 33 are shown by enlarging the bearing 192 portion in FIG. 29. And, at least the outer surface of the outer ring is randomly formed with an innumerable number of microconcave-like pits for surface-microroughening.

Needle Roller Baring for Hydraulic Pumps

Figure 34:
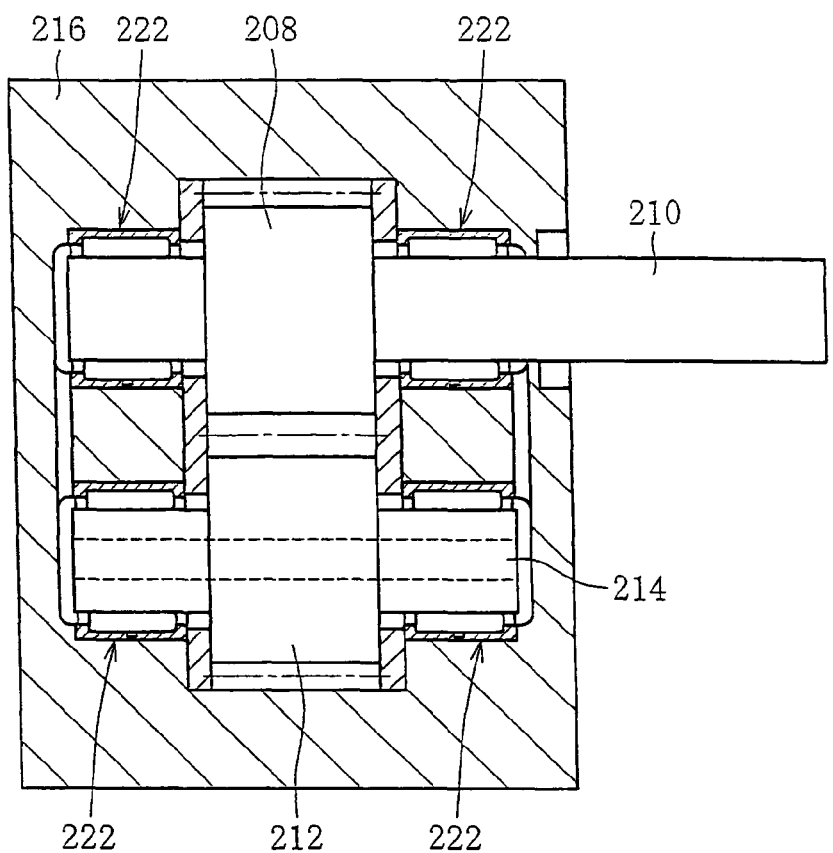
FIG. 34 is a longitudinal sectional view of needle roller bearings for gear pumps.
Figure 35:
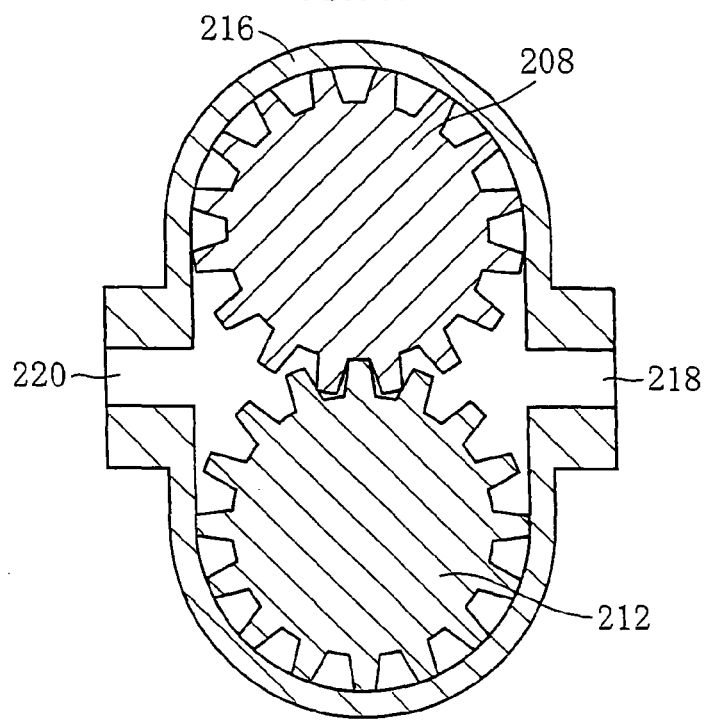
FIG. 35 is a longitudinal sectional view of a gear pump.

FIGS. 34 and 35 show sectional views of a general external gear pump as a typical example of a hydraulic pump. As is known in the art, the external gear pump is composed of a pair of external gears 208 and 212. That is, the pair of gears 208 and 212 are received in a casing 216, with the shaft sections 210 and 214 of the gears 208 and 212 being rotatably supported through needle roller bearings 222. And, the casing 216 has a suction port 218 and a delivery port 222, so that when the gears 208 and 212 rotate, oil is sucked in through the suction port 218 and the pressurized oil is delivered from the delivery port 220. The shaft-supporting needle roller bearings in the described gear pump each have an inner ring and an outer ring and rolling elements as maim component elements.

In addition, the needle roller bearings 222 of FIGS. 34 and 35 are of the type in which the outer peripheral surfaces of the shafts 210 and 214 are used directly as raceway surfaces, with no inner ring. And, the rolling surfaces and end surfaces of the rolling elements, and/or the raceway surfaces of the inner and outer rings are randomly formed with an innumerable number of microconcave-like pits for surface-microroughening.

Figure 36:
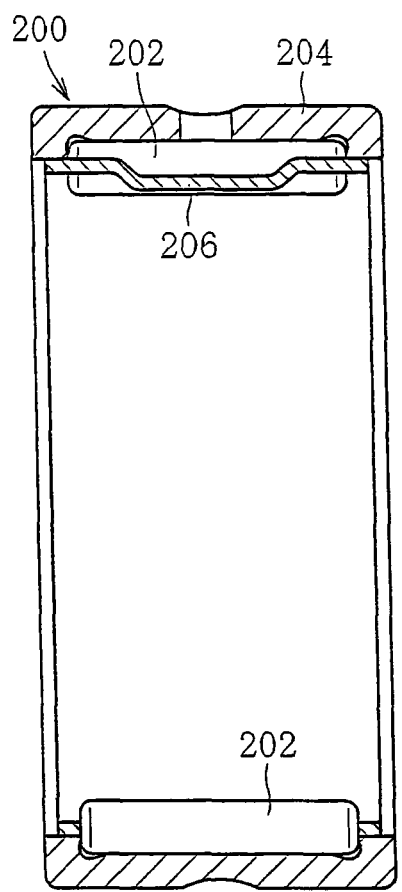
FIG. 36 is a cross sectional view of the gear pump of FIG. 35.

A needle roller bearing 200 for gear pumps, shown in FIG. 36, is a needle roller bearing in which needle rollers 202 serving as rolling elements are incorporated into an outer ring 204, with the needle rollers 202 supporting a mating shaft (not shown). The needle rollers 202 are held circumferentially uniformly and rollably by a cage 206.

Needle Roller Bearing for Internal Combustion Engine Connecting Rods

Figure 37:
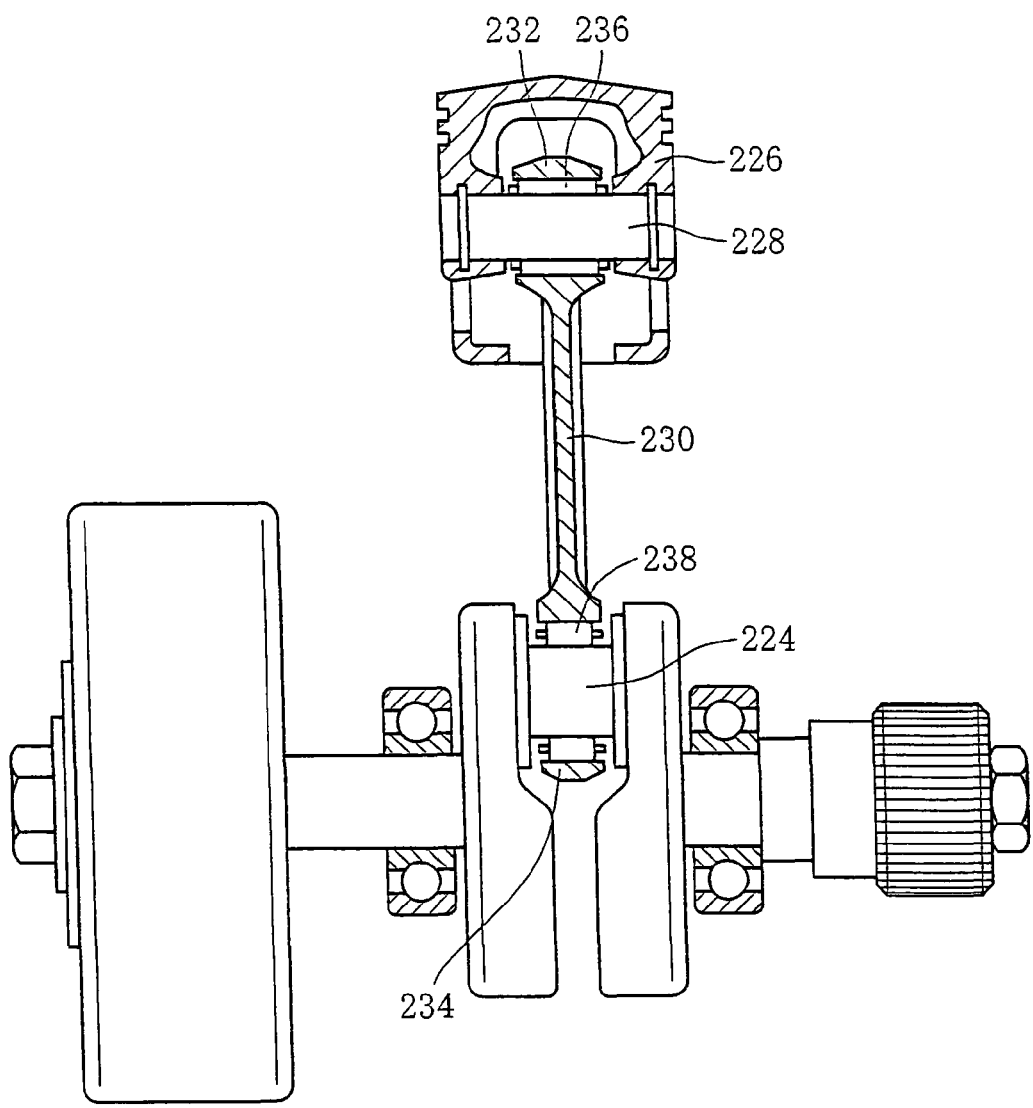
FIG. 37 is a partial sectional view showing the to-be-used portion of a connecting rod.

For example, a 2-cycle internal combustion engine, as shown in FIG. 37, employs an arrangement wherein a crank pin 224 and a piston pin 228 for a piston 226 are connected by a connecting rod 230, and needle roller bearings 236 and 238 are interposed between the small end 232 of the connecting rod 230 and the piton pin 228 and between the large end 234 of the connecting rod 230 and the crank pin 224.

Various structural problems are internalized around the needle roller bearing 236 in the small end 232. For example, there are (I) wear of the cylinder slide surface, (II) flexure of the piston 228 accompanying explosion, (III) inclination of the piston 228, and (IV) wear of the piston pin boss. As measures to be taken under such circumstances, the problems have been coped with by the industrialization of dispersion plating against (I), the setting of critical thickness against (II), and the control of the small end of the connecting rod against (III). Particularly, as for prevention of inclination of the connecting rod, there have been proposed the sphericalization of the outer diameter surface of the connecting rod and the formation of the opposite widthwise surfaces of the connecting rod as thrust bearings.

In this connection, wear of the piston rod 228 in said (VI) occurs in steel of which the piston rod 228 is made, while the piston rod 226 is made of aluminum, so that wear occurs in that a clearance is produced in the fit due to thermal effects which accompany explosion. Wear of the piston rod 228 forms a cause of inclination of the piston pin 228, easily tending to produce edge loads in the needle roller bearing 236 in the small end 232 of the connecting rod, causing early flaking. Therefore, it is necessary to take measures against wear of the piston pin 228.

Tendency toward higher speed rotation of industrial engines under lean lubrication resulting from the requirements of environmental control and low rate of fuel consumption has been advancing in recent years, leading to frequent occurrences of surface-start abrasion caused by occurrences of metal contact due to poor lubrication.

What is claimed is:

1. A rolling bearing wherein at least surfaces of rolling elements are randomly formed with microconcave pits such that said surfaces have a combination of a surface roughness parameter Ryni such that $0.4\ \mu m \leq Ryni \leq 1.0\ \mu m$, an Sk value of $-1.6$ or below, a surface roughness parameter Rqni such that $0.05\ \mu m \leq Rqni \leq 0.09\ \mu m$ and a ratio between axial surface roughness Rqni (L) and circumferential surface roughness Rqni (C) that is 1.0 or less.

2. The rolling bearing as set forth in claim 1, wherein said rolling bearing has bearing component elements including an outer member, an inner member and said rolling elements, and at least one of said bearing component elements has a nitrogen rich layer in which a grain size number of austenite crystal grains is in a range exceeding number 10 in accordance with JIS G 0551.

3. The rolling bearing of claim 2, wherein the nitrogen content in said nitrogen rich layer is in a range of 0.1 wt % to 0.7 wt %.

4. The rolling bearing of claim 3, wherein said at least one bearing component is a raceway ring, and said nitrogen content is the value at a 50 μm deep surface after grinding.

5. The rolling bearing of claim 1, wherein said rolling bearing is in an air conditioner compressor.

6. The rolling bearing of claim 1, wherein said rolling bearing is in a planetary gear device.

7. The rolling bearing of claim 1, wherein said rolling bearing is used with an engine rocker arm.

8. The rolling bearing of claim 1, wherein said rolling bearing is in a hydraulic pump.

9. The rolling bearing of claim 1, wherein said rolling bearing is used with an internal combustion engine connecting rod.

10. A rolling bearing wherein at least surfaces of rolling elements are randomly formed with microconcave pits, said rolling elements each having a nitrogen rich layer in which a grain size number of austenite crystal grains is in a range exceeding number 10 in accordance with JIS G 0551 and wherein said surfaces have a combination of a surface roughness parameter Ryni such that $0.4\ \mu m \leq Ryni \leq 1.0\ \mu m$, a surface roughness parameter Rqni such that $0.05\ \mu m \leq Rqni \leq 0.09\ \mu m$ and a ratio between axial surface roughness Rqni (L) and circumferential surface roughness Rqni (C) that is 1.0 or less.

11. The rolling bearing of claim 10, wherein an area factor of the pits in said surfaces provided with said pits is in a range of 5-20%.

12. The rolling bearing of claim 10, wherein the nitrogen content in said nitrogen rich layer is in a range of 0.1 wt % to 0.7 wt %.

13. The rolling bearing of claim 12, wherein said at least surfaces of rolling elements includes surfaces of a raceway ring, and said nitrogen content in said surfaces of said raceway ring is the value at a 50 μm deep surface after grinding.

14. The rolling bearing of claim 10, wherein said rolling bearing is in an air conditioner compressor.

15. The rolling bearing of claim 10, wherein said rolling bearing is in a planetary gear device.

16. The rolling bearing of claim 10, wherein said rolling bearing is used with an engine rocker arm.

17. The rolling bearing of claim 10, wherein said rolling bearing is in a hydraulic pump.

18. The rolling bearing of claim 10, wherein said rolling bearing is used with an internal combustion engine connecting rod.

* * * * *